(12) United States Patent
Kobayashi et al.

(10) Patent No.: US 10,259,198 B2
(45) Date of Patent: *Apr. 16, 2019

(54) INTERLAYER FILM FOR LAMINATED GLASS

(71) Applicant: KURARAY CO., LTD., Kurashiki-shi (JP)

(72) Inventors: Takuya Kobayashi, Kurashiki (JP); Takeshi Kusudou, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 232 days.

This patent is subject to a terminal disclaimer.

(21) Appl. No.: 15/118,937

(22) PCT Filed: Feb. 12, 2015

(86) PCT No.: PCT/JP2015/053846
§ 371 (c)(1),
(2) Date: Nov. 2, 2016

(87) PCT Pub. No.: WO2015/125690
PCT Pub. Date: Aug. 27, 2015

(65) Prior Publication Data
US 2017/0043557 A1 Feb. 16, 2017

(30) Foreign Application Priority Data
Feb. 18, 2014 (JP) .................... 2014-029013

(51) Int. Cl.
| B32B 17/10 | (2006.01) |
| C08F 8/28 | (2006.01) |
| C08K 3/22 | (2006.01) |
| C08F 118/08 | (2006.01) |
| C08F 216/38 | (2006.01) |
| C08F 8/12 | (2006.01) |
| C08K 5/103 | (2006.01) |
| C08F 116/38 | (2006.01) |
| C08J 5/18 | (2006.01) |
| C08K 5/11 | (2006.01) |

(52) U.S. Cl.
CPC ........ B32B 17/10 (2013.01); B32B 17/10623 (2013.01); B32B 17/10761 (2013.01); C08F 8/12 (2013.01); C08F 8/28 (2013.01); C08F 116/38 (2013.01); C08F 118/08 (2013.01); C08F 216/38 (2013.01); C08J 5/18 (2013.01); C08K 3/22 (2013.01); C08K 5/103 (2013.01); C08K 5/11 (2013.01); *B32B 2331/04* (2013.01); *C08F 2800/10* (2013.01); *C08J 2329/14* (2013.01); *C08J 2331/04* (2013.01); *C08K 2003/2241* (2013.01); *C08K 2003/2296* (2013.01)

(58) Field of Classification Search
None
See application file for complete search history.

(56) References Cited

U.S. PATENT DOCUMENTS

| 10,016,959 B2 | 7/2018 | Kusudou et al. | |
| 2004/0116013 A1* | 6/2004 | Yoshida | B32B 3/10 442/43 |
| 2010/0247902 A1 | 9/2010 | Fukatani et al. | |
| 2011/0229714 A1* | 9/2011 | Morikawa | B32B 17/10036 428/328 |

FOREIGN PATENT DOCUMENTS

| JP | 5-140211 A | 6/1993 |
| JP | 2007-57906 A | 3/2007 |
| JP | 2009-221029 A | 10/2009 |
| JP | 2010-24061 A | 2/2010 |
| JP | 2011-219670 A | 11/2011 |
| JP | 2011-219671 A1 | 11/2011 |
| JP | 5420804 B1 | 2/2014 |
| JP | 5469286 B1 | 4/2014 |
| JP | 5469287 B1 | 4/2014 |
| WO | 2009/035081 A1 | 3/2009 |
| WO | WO 2009/078471 A1 | 6/2009 |
| WO | 2015/019452 A1 | 2/2015 |

OTHER PUBLICATIONS

Extended European Search Report dated Jan. 12, 2018 in Patent Application No. 15751649.3.
International Search Report dated Mar. 10, 2015 in PCT/JP2015/053846, filed Feb. 12, 2015.

* cited by examiner

*Primary Examiner* — Robert T Butcher
(74) *Attorney, Agent, or Firm* — Oblon, McClelland, Maier & Neustadt, L.L.P.

(57) ABSTRACT

An interlayer for a laminated glass is provided. The interlayer film contains (a) a polyvinyl acetal with an acetalization degree of 60 to 80 mol %, a content of a vinyl ester monomer unit of from 0.1 to 20 mol %, and a viscosity-average degree of polymerization of from 1400 to 4000, and (b) light-diffusing fine particles in which an absolute value difference between a refractive index of the light-diffusing fine particles and a refractive index of the intrlayer excluding the light-diffusing fine particles is 0.20 or more and a haze as measured in accordance with JIS K 7105 for a laminated glass prepared by sandwiching the interlayer film between two glass sheets with a thickness of 3 mm is 20% or less.

12 Claims, 1 Drawing Sheet

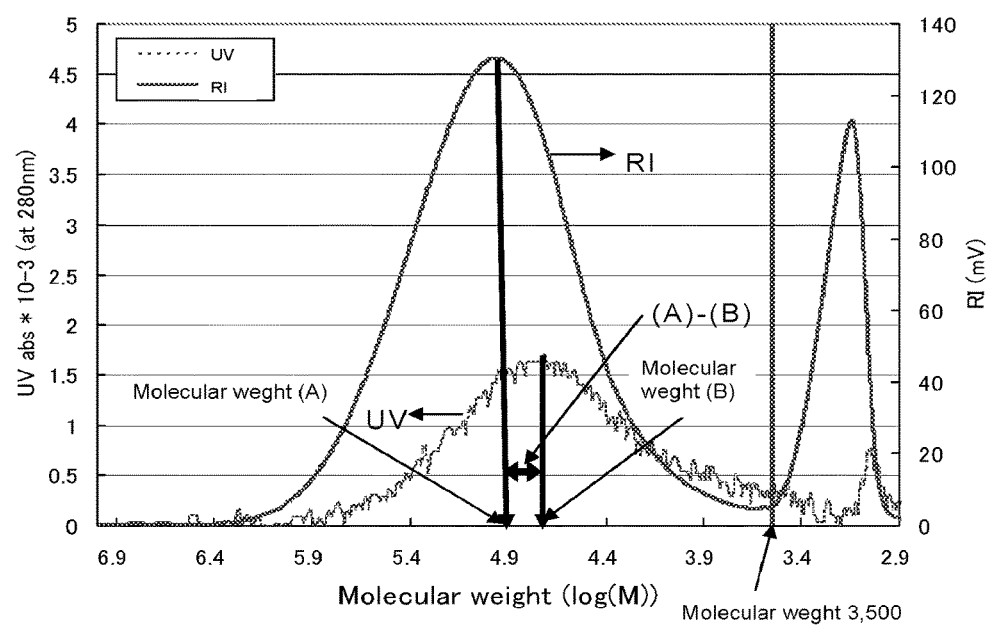

INTERLAYER FILM FOR LAMINATED GLASS

TECHNICAL FIELD

The present invention relates to an interlayer film for a laminated glass. The present invention also relates to a laminated glass comprising the interlayer film for a laminated glass.

BACKGROUND ART

A structure provided with light-diffusing properties by adding fine particles can diffuse light emitted from a point light source such as an electric bulb and an LED or a line light source such as a fluorescent tube and allow the light to emit to a planar direction. Such structures have been extensively used as a backlight source for a liquid-crystal display device, and recently have been increasingly employed for other applications. Such applications include, for example, a light shielding plate as a window material utilizing its property that when a source light is OFF, it is transparent while when a source light is ON, it is opaque due to diffused light in a planar direction, and a light-emitting plate such as illumination, a decoration plate, a billboard and a sign. Examples of such structures which are widely used include a plate-like body made of an acrylic resin, a polycarbonate resin or the like to which fine particles are added, or which is surface-processed.

In addition to an acrylic resin, a polycarbonate resin or the like, a glass sheet is abrasion resistant and resistant to dust adhesion due to less static electricity, and is, therefore, sometimes used as a member constituting a light shielding plate and a light-emitting plate as described above. An example can be a transmissive screen employing a laminated glass employing an interlayer film containing spherical fine particles which satisfy particular requirements as a light-diffusion sheet, together with a Fresnel lens sheet/lenticular lens sheet made of an acrylic resin or the like (see Patent Reference No. 1). A material constituting the interlayer film can be a polyvinyl acetal represented by a polyvinyl butyral. Another example of a laminated glass utilizing diffusion light is a laminated glass which prevent a human or matter from being visually observed while allowing for transmission of visible light to some extent, and which comprises a plurality of glass sheets bonded via interlayer films containing titanium oxide fine particles (see Patent Reference No. 2).

However, an interlayer film made of a polyvinyl acetal has had problems: 1) tendency to discoloration due to heating, 2) tendency to generation of foreign materials (undissolved materials), and 3) tendency to deterioration in penetration resistance when it is used in a safety laminated glass. The problems 1) and 2) may lead to alteration in hue of a light shielding plate and a light-emitting plate, and failure to achieve even light-diffusing properties. The problem 3) may impair safety of a laminated glass. There have been various proposals for solving these problems. For example, Patent Reference Nos. 3 and 4 have described a method for preventing discoloration of a polyvinyl acetal by acetalization at a particular hydroxide ion concentration at an elevated temperature under a high pressure. Patent Reference No. 5 has described a method for preventing discoloration of a polyvinyl acetal obtained, by adding a reducing agent after acetalization and neutralization. However, for the methods described in Patent Reference Nos. 3 to 5, an interlayer film made of a polyvinyl acetal obtained tends to be discolored and to generate foreign materials. Furthermore, when the interlayer film is used in a safety laminated glass, penetration resistance tends to be deteriorated.

Furthermore, for providing a light shielding plate or light-emitting plate having even light-diffusing properties, it is necessary to highly disperse fine particles endowing with light-diffusing properties in an interlayer film made of a polyvinyl acetal. Patent Reference No. 6 has described a method for dispersing inorganic fine particles in an interlayer film made of a polyvinyl acetal by adding an acid-modified polyolefin. However, for a method described in Patent Reference No. 6, there is room for improving dispersibility of fine particles in an interlayer film made of a polyvinyl acetal. Thus, an interlayer film for a laminated glass made of a polyvinyl acetal whereby the above problems can be completely solved is strongly desired.

PRIOR ART REFERENCES

Patent References

Patent Reference No. 1: JP 2007-57906 A
Patent Reference No. 2: WO 2009/035081 A1
Patent Reference No. 3: JP 2011-219670 A
Patent Reference No. 4: JP 2011-219671 A
Patent Reference No. 5: JP 5-140211 A
Patent Reference No. 6: JP 2009-221029 A

SUMMARY OF THE INVENTION

Problems to be Solved by the Invention

To solve the above problems, an objective of the present invention is to provide an interlayer film for a laminated glass comprising a polyvinyl acetal which is resistant to discoloration due to heating and contains less foreign materials (undissolved materials) and in which light-diffusing fine particles are dispersed in a non-agglomerated state. Another objective is to provide a laminated glass exhibiting excellent penetration resistance, excellent transparency and excellent light-diffusing properties.

Means for Solving the Problems

After intensive investigation, we have found that the above problems can be solved by the inventions of [1] to [13] below.

Specifically, the present invention relates to:

[1] an interlayer film for a laminated glass containing a polyvinyl acetal, the film being made of a composition comprising a polyvinyl acetal with an acetalization degree of 60 to 80 mol %, a content of a vinyl ester monomer unit of 0.1 to 20 mol % and a viscosity-average degree of polymerization of 1400 to 4000, and light-diffusing fine particles, wherein a difference absolute value between a refractive index of the light-diffusing fine particles and a refractive index of the composition free from the light-diffusing fine particles is 0.20 or more and a haze as measured in accordance with JIS K 7105 for a laminated glass prepared by sandwiching the interlayer film for a laminated glass between two glass sheets with a thickness of 3 mm is 20% or less, and the interlayer film for a laminated glass satisfies formulas (1) and (2):

$$(A-B)/A<0.80 \tag{1}$$

$$1.00\times10^{-2}<(b/y)/(a/x)<2.00\times10^{-1} \tag{2}$$

wherein "A", "a", "B", "b", "x", and "y" are as defined below;

"A" is a peak-top molecular weight of a polymer component as measured by a differential refractive index detector in gel-permeation chromatographic (hereinafter, sometimes abbreviated as "GPC") measurement of said interlayer film for a laminated glass heated at 230° C. for 3 hours;

"a" is a signal strength at a peak-top molecular weight (A);

"B" is a peak-top molecular weight of a polymer component as measured by an absorptiometer (measuring wavelength: 280 nm) in GPC measurement of said interlayer film for a laminated glass heated at 230° C. for 3 hours;

"b" is a signal strength at a peak-top molecular weight (B);

"x" is a signal strength at a peak-top molecular weight as measured by a differential refractive index detector in GPC measurement of a monodisperse polymethyl methacrylate (hereinafter, sometimes abbreviated as "PMMA"); and "y" is a signal strength at a peak-top molecular weight as measured by an absorptiometer (measuring wavelength: 220 nm) in GPC measurement of said monodisperse PMMA.

The present invention also relates to

[2] the interlayer film for a laminated glass according to [1], which satisfies formulas (3) and (4):

$$(A-C)/A<0.80 \tag{3}$$

$$5.00\times10^{-3}<(c/y)/(a/x)<7.00\times10^{-2} \tag{4}$$

wherein "A", "a", "C", "c", "x" and "y" are as defined below;

"A" is as defined for formula (1);

"a", "x" and "y" are as defined for formula (2);

"C" is a peak-top molecular weight of a polymer component as measured by an absorptiometer (measuring wavelength: 320 nm) in GPC measurement of said interlayer film for a laminated glass heated at 230° C. for 3 hours; and "c" is a signal strength at a peak-top molecular weight (C).

The present invention also relates to

[3] the interlayer film fora laminated glass according to [1] or [2], wherein said polyvinyl acetal is a polyvinyl butyral (hereinafter, sometimes abbreviated as "PVB");

[4] the interlayer film for a laminated glass according to any of [1] to [3], further comprising a plasticizer;

[5] the interlayer film for a laminated glass according to [4], comprising triethylene glycol di(2-ethylhexanoate) as a plasticizer;

[6] the interlayer film for a laminated glass according to any of [1] to [5], wherein said light-diffusing fine particles are made of an inorganic compound;

[7] the interlayer film for a laminated glass according to [6], wherein said inorganic compound is a metal oxide;

[8] the interlayer film for a laminated glass according to [7], wherein said metal oxide is titanium oxide;

[9] the interlayer film for a laminated glass according to [7], wherein said metal oxide is zinc oxide;

[10] the interlayer film for a laminated glass according to any of [6] to [9], wherein a content of said light-diffusing fine particles is 0.001 to 0.040%;

[11] a laminated glass consisting of a plurality of glass sheets bonded via the interlayer film for a laminated glass according to any of [1] to [9];

[12] a process for manufacturing the interlayer film for a laminated glass according to any of [1] to [10], comprising acetalizing a polyvinyl alcohol (hereinafter, sometimes abbreviated as "PVA") to provide a polyvinyl acetal with an acetalization degree of 60 to 80 mol %, a content of a vinyl ester monomer unit of 0.1 to 20 mol %, and a viscosity-average degree of polymerization of 1400 to 4000, and then melt-molding the polyvinyl acetal;

[13] a light diffusion plate comprising the laminated glass according to [11], as a structural component;

[14] a light-emitting plate comprising the laminated glass according to [11];

[15] a sun roof panel comprising the laminated glass according to [11], as a structural component.

Effects of the Invention

According to the present invention, there can be provided an interlayer film for a laminated glass comprising a polyvinyl acetal which is resistant to discoloration due to heating and contains less foreign materials and in which light-diffusing fine particles are dispersed in a non-agglomerated state. Furthermore, there can be provided a laminated glass exhibiting excellent penetration resistance, excellent transparency and excellent light-diffusing properties.

BRIEF DESCRIPTION OF THE DRAWINGS

The FIGURE is an exemplary graph showing relationship between a molecular weight and a value as measured by a differential refractive index detector (RI), and a relationship between a molecular weight and an absorbance as measured by an absorptiometer (UV) (measuring wavelength: 280 nm) for an interlayer film for a laminated glass of the present invention.

MODES FOR CARRYING OUT THE INVENTION

An interlayer film for a laminated glass of the present invention is made of a composition comprising a polyvinyl acetal with an acetalization degree of 60 to 80 mol %, a content of a vinyl ester monomer unit of 0.1 to 20 mol % and a viscosity-average degree of polymerization of 1400 to 4000, and light-diffusing fine particles, wherein a difference absolute value between a refractive index of the light-diffusing fine particles and a refractive index of the composition free from the light-diffusing fine particles is 0.20 or more and a haze as measured in accordance with JIS K 7105 for a laminated glass prepared by sandwiching the interlayer film for a laminated glass between two glass sheets with a thickness of 3 mm is 20% or less, and the interlayer film for a laminated glass satisfies formulas (1) and (2):

$$(A-B)/A<0.80 \tag{1}$$

$$1.00\times10^{-2}<(b/y)/(a/x)<2.00\times10^{-1} \tag{2}$$

wherein "A", "a", "B", "b", "x", and "y" are as defined below;

"A" is a peak-top molecular weight of a polymer component as measured by a differential refractive index detector in GPC measurement of said interlayer film for a laminated glass heated at 230° C. for 3 hours;

"a" is a signal strength at a peak-top molecular weight (A);

"B" is a peak-top molecular weight of a polymer component as measured by an absorptiometer (measuring wavelength: 280 nm) in GPC measurement of said interlayer film for a laminated glass heated at 230° C. for 3 hours;

"b" is a signal strength at a peak-top molecular weight (B);

"x" is a signal strength at a peak-top molecular weight as measured by a differential refractive index detector in GPC measurement of a monodisperse PMMA; and "y" is a signal strength at a peak-top molecular weight as measured by an absorptiometer (measuring wavelength: 220 nm) in GPC measurement of said monodisperse PMMA.

Here, in GPC measurement of an interlayer film for a laminated glass and a monodisperse PMMA, Mobile phase: hexafluoroisopropanol with 20 mmol/L sodium trifluoroacetate (hereinafter, hexafluoroisopropanol is sometimes abbreviated as HFIP)

Sample concentration: 1.00 mg/mL (solvent: HFIP with 20 mmol/L sodium trifluoroacetate)

Sample injection volume: 100 μL

Column temperature: 40° C.

Flow rate: 1.0 mL/min.

In the present invention, GPC measurement is conducted using a GPC instrument equipped with a differential refractive index detector and an absorptiometer, which permits concurrent measurement using these detectors. A cell in a detection unit in the absorptiometer preferably has a cell length (optical path length) of 10 mm. The absorptiometer may be a type which measures absorption of UV ray with a particular wavelength or a type which spectrometrically measures UV-ray absorption having a wavelength within a particular range. An interlayer film for a laminated glass to be measured is separated into individual molecular-weight components by a GPC column. A signal strength as measured by a differential refractive index detector is generally proportional to a concentration of components (g/L) constituting an interlayer film for a laminated glass. Meanwhile, components detected by an absorptiometer are only those having a structure which can absorb a given wavelength. For each molecular-weight component in the interlayer film for a laminated glass, a concentration and an absorbance at a given wave length can be measured by the GPC measurement described above.

A solvent and a mobile phase used for dissolving an interlayer film for a laminated glass and a monodisperse PMMA measured in the above GPC measurement is HFIP with 20 mmol/L sodium trifluoroacetate. HFIP can dissolve an interlayer film for a laminated glass of the present invention and a PMMA. Furthermore, addition of sodium trifluoroacetate allows for inhibiting adsorption of components of an interlayer film for a laminated glass and/or a PMMA to a column filler. A flow rate and a column temperature in the GPC measurement are appropriately regulated, depending on the type of a column used and so on. In the GPC measurement, a flow rate is generally 1.0 mL/min and a column temperature is generally 40° C.

There are no particular restrictions to a GPC column used in the GPC measurement as long as it can separate components in an interlayer film for a laminated glass of the present invention according to a molecular weight. Specifically, "GPC HFIP-806M" from Showa Denko K. K. or the like can be suitably used.

Herein, a peak-top molecular weight (A) and a peak-top molecular weight (B) are determined using a calibration curve. For creating a calibration curve, molecular weights are measured for several monodisperse PMMAs having a different molecular weight used as standards for a calibration curve, and a calibration curve is formed on the basis of GPC elution volumes and molecular weights of the monodisperse PMMAs. Herein, for measurement by a differential refractive index detector, a calibration curve formed using the detector is used, while for measurement by an absorptiometer, a calibration curve formed using the detector (measuring wavelength: 220 nm) is used. Using these calibration curves, a GPC elution volume is converted to a peak-top molecular weight (A) and a peak-top molecular weight (B).

Before the above GPC measurement, an interlayer film for a laminated glass is heated at 230° C. for 3 hours. Herein, an interlayer film for a laminated glass is heated by the following method. An interlayer film for a laminated glass is heated by hot-pressing it at a pressure of 2 MPa and a temperature of 230° C. for 3 hours. Thus, difference in sample hue after heating is clearly reflected to a difference in an absorbance (that is, a signal strength detected by an absorptiometer). A thickness of an interlayer film for a laminated glass to be heated is 600 to 800 μm, preferably about 760 μm which is a thickness of a common interlayer film for a laminated glass.

After heating, the interlayer film for a laminated glass is dissolved in the above solvent (HFIP with sodium trifluoroacetate) to prepare a measurement sample. A concentration of the measurement sample is 1.00 mg/mL and an injection volume is 100 μL. Here, if a viscosity-average degree of polymerization of the polyvinyl acetal in the interlayer film for a laminated glass is over 2,400, an excluded volume is so increased that at a concentration of the measurement sample of 1.00 mg/mL, measurement may not be reproducibly conducted. In such a case, an appropriately diluted sample (injection volume: 100 μL) is used. A signal strength detected by an absorptiometer and a differential refractive index detector is proportional to a sample concentration. Therefore, using a concentration of a diluted sample and each signal strength observed, a measured value is converted to each signal strength at a measurement sample concentration of 1.00 mg/mL.

The FIGURE is an exemplary graph showing a relationship between a molecular weight and a signal strength as measured by a differential refractive index detector, and a relationship between a molecular weight and a signal strength (absorbance) as measured by an absorptiometer (measuring wavelength: 280 nm), which were obtained by GPC measurement of an interlayer film for a laminated glass of the present invention. Using the FIGURE, there will be further described GPC measurement in the present invention. In the FIGURE, the chromatogram indicated by "RI" is a plot of signal strength as measured by a differential refractive index detector to a molecular weight of a component of an interlayer film for a laminated glass converted from an elution volume (horizontal axis). A peak observed around a molecular weight of 100,000 (log(M)=5.0) in the chromatogram is a peak of a polymer component. Herein, a molecular weight at such a peak position of a polymer component is a peak-top molecular weight (A) of the polymer component, and a signal strength at the peak-top molecular weight (A) is a signal strength (a). An interlayer film for a laminated glass of the present invention contains a polyvinyl acetal with a viscosity-average degree of polymerization of 1,400 to 4,000, so that a peak-top molecular weight (A) of a polymer component is generally over 3,500. In the FIGURE, in the case that a plasticizer is contained in the interlayer film for a laminated glass, a peak observed around a molecular weight of 1,500 is a peak of the plasticizer. When a plurality of peaks with a peak-top molecular weight over 3,500 is present in the chromatogram, a molecular weight at the highest peak is regarded as a peak-top molecular weight (A).

In the FIGURE, the chromatogram indicated by "UV" is a plot of a signal strength (absorbance) as measured by an absorptiometer (measuring wavelength: 280 nm) to a molecular weight of a component of an interlayer film for a laminated glass converted from an elution volume (horizontal axis). A peak observed around a molecular weight of 50,000 (log(M)=4.7) in the chromatogram is a peak of a polymer component. Herein, a molecular weight at such a peak position of a polymer component is a peak-top molecular weight (B) of the polymer component, and a signal strength (absorbance) at the peak-top molecular weight (B) is a signal strength (b). An interlayer film for a laminated glass of the present invention contains the polyvinyl acetal with a viscosity-average degree of polymerization of 1,400 to 4,000, so that a peak-top molecular weight (B) of a polymer component is generally over 3,500. When a plurality of peaks with a peak-top molecular weight over 3,500 is present in the chromatogram, a molecular weight at the highest peak is regarded as a peak-top molecular weight (B).

In FIG. 1, the chromatogram indicated by "UV" is a plot of a signal strength (absorbance) as measured by an absorptiometer (measuring wavelength: 280 nm) to a molecular weight of a component of an interlayer film for a laminated glass converted from an elution volume (horizontal axis). A peak observed around a molecular weight of 50,000 (log (M)=4.7) in the chromatogram is a peak of a polymer component. Herein, a molecular weight at such a peak position of a polymer component is a peak-top molecular weight (B) of the polymer component, and a signal strength (absorbance) at the peak-top molecular weight (B) is a signal strength (b). An interlayer film for a laminated glass of the present invention contains the polyvinyl acetal with a viscosity-average degree of polymerization of 1,400 to 4,000, so that a peak-top molecular weight (B) of a polymer component is generally over 3,500. When a plurality of peaks with a peak-top molecular weight over 3,500 is present in the chromatogram, a molecular weight at the highest peak is regarded as a peak-top molecular weight (B).

In an interlayer film for a laminated glass of the present invention, the following formula (1) is satisfied by a peak-top molecular weight (A) of a polymer component as measured by a differential refractive index detector and a peak-top molecular weight (B) of a polymer component as measured by an absorptiometer (measuring wavelength: 280 nm), obtained by GPC measurement as described above.

$$(A-B)/A < 0.80 \tag{1}$$

A peak-top molecular weight (A) is a measure of a molecular weight of a polymer component in an interlayer film for a laminated glass. A peak-top molecular weight (B) is derived from a component having absorption at 280 nm which is present in a polymer component. A peak-top molecular weight (A) is generally larger than a peak-top molecular weight (B), so that (A−B)/A is positive. The larger a peak-top molecular weight (B) is, the smaller (A−B)/A is, while the smaller a peak-top molecular weight (B) is, the larger (A−B)/A is. It indicates that a larger (A−B)/A means more components absorbing UV ray with a wavelength of 280 nm in low-molecular-weight components in a polymer component.

If (A−B)/A is 0.80 or more, more components absorbing UV rays with a wavelength of 280 nm are present in low-molecular-weight components as described above. In such a case, foreign materials in an interlayer film for a laminated glass increase. Furthermore, it causes disruption of a performance balance among discoloration resistance of the interlayer film for a laminated glass, foreign materials (undissolved materials) in the interlayer film for a laminated glass, and penetration resistance of a laminated glass produced using the interlayer film for a laminated glass. (A−B)/A is preferably less than 0.75, more preferably less than 0.70.

An interlayer film for a laminated glass of the present invention satisfies the following formula (2).

$$1.00 \times 10^{-2} < (b/y)/(a/x) < 2.00 \times 10^{-1} \tag{2}$$

In formula (2), "a" is a signal strength as measured by a differential refractive index detector at the peak-top molecular weight (A) in the GPC measurement, and "b" is a signal strength (absorbance) as measured by an absorptiometer (measuring wavelength: 280 nm) at the peak-top molecular weight (B).

In formula (2), "x" is a signal strength at a peak-top molecular weight as measured by a differential refractive index detector when a monodisperse PMMA is measured by GPC, and "y" is a signal strength (absorbance) at peak-top molecular weight as measured by an absorptiometer (measuring wavelength: 220 nm) when the monodisperse PMMA is measured by GPC. GPC measurement of a monodisperse PMMA is conducted as described for GPC measurement of an interlayer film for a laminated glass, except that an interlayer film for a laminated glass after heating is replaced by a monodisperse PMMA and a measuring wavelength of the absorptiometer is changed to 220 nm. A signal strength (x) is determined as described for a signal strength (a). A signal strength (y) is determined as described for a signal strength (b). A monodisperse PMMA used for determining "x" and "y" is preferably a PMMA with a weight-average molecular weight of about 85,000.

Here, (b/y)/(a/x) is a measure of a content of components having a structure absorbing UV ray with a wavelength of 280 nm in a polymer component in an interlayer film for a laminated glass. It means that the larger this value is, the larger the content is. As described above, a signal strength as measured by a differential refractive index detector is substantially proportional to a concentration of a component (g/L) of an interlayer film for a laminated glass. Meanwhile, an absorptiometer detects only components having absorption at a measuring wavelength of 280 nm, and a signal strength (absorbance) as measured by an absorptiometer is proportional to a concentration of components having absorption at 280 nm. In general, a signal strength as measured by a differential refractive index detector is expressed in "millivolt", while a signal strength (absorbance) as measured by an absorptiometer is expressed in "absorbance unit (A.U.)".

Here, a signal strength (a) as measured by a differential refractive index detector and a signal strength (b) as measured by an absorptiometer varies depending on the type of a GPC device and the measurement conditions, and a ratio between these cannot be simply compared. In contrast, in the present invention, a ratio between a signal strength as measured by a differential refractive index detector and a signal strength as measured by an absorptiometer can be determined without variation depending on the type of a GPC device and the measurement conditions, as described below.

In the present invention, a ratio (a/x) of a signal strength (a) of an interlayer film for a laminated glass as measured by a differential refractive index detector to a signal strength (x) of a monodisperse PMMA as measured by a differential refractive index detector, and a ratio (b/y) of a signal strength (b) of an interlayer film for a laminated glass as measured by an absorptiometer to a signal strength (y) of a monodisperse PMMA as measured by an absorptiometer are determined, respectively. Then, a ratio between these, (b/y)/(a/x), is determined and is used as a measure of a content of components having a structure absorbing UV ray with a wavelength of 280 nm. By using a signal strength of a monodisperse PMMA as a standard as described above, the same measure can be used for evaluation, independently of the type of the device and the measurement conditions.

An interlayer film for a laminated glass of the present invention preferably satisfies formula (2'), more preferably formula (2").

$$1.50 \times 10^{-2} < (b/y)/(a/x) < 1.50 \times 10^{-1} \qquad (2')$$

$$2.00 \times 10^{-2} < (b/y)/(a/x) < 1.00 \times 10^{-1} \qquad (2'')$$

If (b/y)/(a/x) is $1.00 \times 10^{-2}$ or less, the amount of components absorbing UV ray with a wavelength of 280 nm in a polymer component of an interlayer film for a laminated glass is insufficient as described above. Therefore, foreign materials (undissolved materials) in the interlayer film for a laminated glass increase. Furthermore, it leads to disruption of a performance balance among discoloration resistance of the interlayer film for a laminated glass, foreign materials (undissolved materials) of the interlayer film for a laminated glass and penetration resistance of a laminated glass produced using the interlayer film for a laminated glass. In contrast, if (b/y)/(a/x) is $2.00 \times 10^{-1}$ or more, the amount of components absorbing UV ray with a wavelength of 280 nm in a polymer component of an interlayer film for a laminated glass is excessive. Therefore, discoloration resistance of the interlayer film for a laminated glass and penetration resistance of a laminated glass produced are deteriorated.

In the light of good performance balance among discoloration resistance of the interlayer film for a laminated glass, foreign materials (undissolved materials) of the interlayer film for a laminated glass and penetration resistance of a laminated glass produced using the interlayer film for a laminated glass, it is preferable that in the GPC measurement, a peak-top molecular weight (A) as measured by a differential refractive index detector and a peak-top molecular weight (C) as measured by an absorptiometer (measuring wavelength: 320 nm) satisfy the following formula (3).

$$(A-C)/A < 0.80 \qquad (3)$$

A peak-top molecular weight (C) is measured as described for a peak-top molecular weight (B), except that in an absorptiometer, a measuring wavelength is 320 nm. A peak-top molecular weight (C) is derived from components having absorption at 320 nm in a polymer component in an interlayer film for a laminated glass. In general, a peak-top molecular weight (A) is larger than a peak-top molecular weight (C), so that (A-C)/A is positive. The larger a peak-top molecular weight (C) is, the smaller (A-C)/A is, while the smaller a peak-top molecular weight (C) is, the larger (A-C)/A is. It indicates that a larger (A-C)/A means more components absorbing UV ray with a wavelength of 320 nm in low-molecular-weight components in a polymer component.

If (A-C)/A is 0.80 or more, more components absorbing UV rays with a wavelength of 320 nm are present in low-molecular-weight components as described above. In such a case, foreign materials in an interlayer film for a laminated glass may increase. Furthermore, it may lead to disruption of a performance balance among discoloration resistance of the interlayer film for a laminated glass, foreign materials (undissolved materials) of the interlayer film for a laminated glass and a penetration resistance of a laminated glass produced using the interlayer film for a laminated glass. (A-C)/A is preferably less than 0.75, more preferably less than 0.70.

Preferably, an interlayer film for a laminated glass of the present invention satisfies formula (4).

$$5.00 \times 10^{-3} < (c/y)/(a/x) < 7.00 \times 10^{-2} \qquad (4)$$

In formula (4), "a", "x" and "y" are as defined for formula (2), and "c" is a signal strength (absorbance) as measured by an absorptiometer (measuring wavelength: 320 nm) at a peak-top molecular weight (C).

Here, (c/y)/(a/x) is a measure of a content of components having a structure absorbing UV ray with a wavelength of 320 nm in a polymer component of an interlayer film for a laminated glass. The larger this value is, the larger the content is. It can be determined as described for (b/y)/(a/x) except that in an absorptiometer, a measuring wavelength is 320 nm.

An interlayer film for a laminated glass of the present invention preferably satisfies formula (4'), more preferably formula (4").

$$7.00 \times 10^{-3} < (c/y)/(a/x) < 6.00 \times 10^{-2} \qquad (4')$$

$$1.00 \times 10^{-2} < (c/y)/(a/x) < 5.00 \times 10^{2} \qquad (4'')$$

If (c/y)/(a/x) is $5.00 \times 10^{-3}$ or less, the amount of components absorbing UV ray with a wavelength of 320 nm in a polymer component of an interlayer film for a laminated glass is insufficient, as described above. Therefore, foreign materials in the interlayer film for a laminated glass may increase. Furthermore, it may lead to disruption of a performance balance among discoloration resistance of the interlayer film for a laminated glass, foreign materials (undissolved materials) of the interlayer film for a laminated glass and penetration resistance of a laminated glass produced using the interlayer film for a laminated glass. In contrast, if (c/y)/(a/x) is $7.00 \times 10^{-2}$ or more, the amount of components absorbing UV ray with a wavelength of 320 nm in a polymer component of an interlayer film for a laminated glass is excessive. Therefore, discoloration resistance of the interlayer film for a laminated glass and penetration resistance of a laminated glass produced may be deteriorated.

An acetalization degree of a polyvinyl acetal in an interlayer film for a laminated glass of the present invention is 60 to 80 mol %. The acetalization degree is preferably 62 to 78 mol %, more preferably 65 to 75 mol %. If the acetalization degree is less than 60 mol %, compatibility with a plasticizer or the like is lowered. Furthermore, penetration resistance of a laminated glass obtained is lowered. If the acetalization degree is more than 80 mol %, efficiency of the acetalization reaction is considerably reduced, so that the reaction must be conducted at an elevated temperature for a longer period. As a result, penetration resistance of a laminated glass obtained is lowered and discoloration resistance of an interlayer film for a laminated glass obtained is lowered.

Here, an acetalization degree is a proportion of acetalized vinyl alcohol monomer units based on the total monomer units constituting a polyvinyl acetal. The remaining non-acetalized vinyl alcohol monomer units in the starting polyvinyl alcohol (hereinafter, sometimes abbreviated as "PVA") still remain in the polyvinyl acetal obtained as vinyl alcohol monomer units.

Herein, a viscosity-average degree of polymerization of the polyvinyl acetal is expressed as a viscosity-average degree of polymerization of a starting PVA measured in accordance with JIS-K6726. Specifically, a polyvinyl alcohol is re-saponified to a saponification degree of 99.5 mol % or more and purified, followed by measuring its limiting viscosity [η] in water at 30° C., which can be used for determining a viscosity-average degree of polymerization from the equation below. A viscosity-average degree of polymerization of a PVA is substantially equal to a viscosity-average degree of polymerization of a polyvinyl acetal as its acetalization product.

$$P=([\eta]\times 10000/8.29)^{(1/0.62)}$$

A viscosity-average degree of polymerization of the above polyvinyl acetal is 1400 to 4000, preferably 1500 to 3000. If the viscosity-average degree of polymerization is less than 1400, strength of the interlayer film for a laminated glass is insufficient to achieve satisfactory penetration resistance of a laminated glass obtained. On the other hand, if the polymerization degree is more than 4000, a melt viscosity becomes too high to form a film.

A content of vinyl ester monomer units in the above polyvinyl acetal is 0.1 to 20 mol %, preferably 0.3 to 18 mol %, more preferably 0.5 to 15 mol %, further preferably 0.7 to 13 mol %. If a content of a vinyl ester monomer unit is less than 0.1 mol %, a polyvinyl acetal cannot be stably produced and cannot be formed into a film. If a content of a vinyl ester monomer unit is more than 20 mol %, an interlayer film for a laminated glass is significantly discolored.

A content of monomer units other than acetalized monomer units, vinyl ester monomer units and vinyl alcohol monomer units in the above polyvinyl acetal is preferably 20 mol % or less, more preferably 10 mol % or less.

The above polyvinyl acetal is generally produced by acetalizing a polyvinyl alcohol. A polyvinyl alcohol is generally produced by saponifying a polyvinyl ester.

A polyvinyl ester is produced by polymerizing a vinyl ester monomer. Examples of a vinyl ester monomer which is used for producing a polyvinyl ester include vinyl formate, vinyl acetate, vinyl propionate, vinyl valerate, vinyl caprate, vinyl laurate, vinyl stearate, vinyl acetate, vinyl benzoate, vinyl pivalate and vinyl versatate, particularly preferably vinyl acetate.

A PVA having terminal functional groups derived from the thiol compound can be produced by polymerizing a vinyl ester monomer in the presence of a thiol compound such as 2-mercaptoethanol, n-dodecyl mercaptan, mercaptoacetic acid and 3-mercaptopropionic acid to give a polyvinyl ester and then saponifying the polyvinyl ester.

A vinyl ester monomer can be polymerized by a known method such as bulk polymerization, solution polymerization, suspension polymerization and emulsion polymerization. Among these, bulk polymerization in a nonsolvent system and solution polymerization using a solvent such as an alcohol are generally employed. In the light of improving the effects of the present invention, solution polymerization where polymerization is conducted in a lower alcohol is preferable. Preferably, the lower alcohol is an alcohol having 3 or less carbon atoms such as, but not limited to, methanol, ethanol, propanol and isopropanol, and generally, methanol is used. When the polymerization reaction is conducted by bulk polymerization or solution polymerization, the reaction can be any of batch and continuous types. Examples of an initiator used in the polymerization reaction include known initiators including an azo initiator such as 2,2'-azobisisobutyronitrile, 2,2'-azobis(2,4-dimethyl-valeronitrile), and 2,2'-azobis(4-methoxy-2,4-dimethylvaleronitrile); and an organic peroxide initiator such as benzoyl peroxide, n-propyl peroxycarbonate and peroxydicarbonate as long as the effect of the present invention is not impaired. Among these, an organic peroxide initiator which has a half-life period of 10 to 110 min at 60° C. is preferably used, particularly preferably peroxydicarbonate. A polymerization temperature during the polymerization reaction is suitably, but not limited to, 5 to 200° C.

In radical polymerization of a vinyl ester monomer, as necessary, copolymerization can be conducted with a copolymerizable monomer as long as the effect of the present invention is not impaired. Examples of such a monomer include α-olefins such as ethylene, propylene, 1-butene, isobutene and 1-hexene; carboxylic acids or their derivatives such as fumaric acid, maleic acid, itaconic acid, maleic anhydride and itaconic anhydride; acrylic acid or its salts thereof; acrylic acid esters such as methyl acrylate, ethyl acrylate, n-propyl acrylate and isopropyl acrylate; methacrylic acid or its salts; methacrylic acid esters such as methyl methacrylate, ethyl methacrylate, n-propyl methacrylate and isopropyl methacrylate; acrylamide derivatives such as acrylamide, N-methylacrylamide and N-ethylacrylamide; methacrylamide derivatives such as methacrylamide, N-methylmethacrylamide and N-ethylmethacrylamide; vinyl ethers such as methyl vinyl ether, ethyl vinyl ether, n-propyl vinyl ether, isopropyl vinyl ether and n-butyl vinyl ether; hydroxyl-containing vinyl ethers such as ethyleneglycol vinyl ether, 1,3-propanediol vinyl ether and 1,4-butanediol vinyl ether; allyl ethers such as allyl acetate, propyl allyl ether, butyl allyl ether and hexyl allyl ether; monomers having an oxyalkylene group; hydroxy-containing α-olefins such as isopropenyl acetate, 3-buten-1-ol, 4-penten-1-ol, 5-hexen-1-ol, 7-octen-1-ol, 9-decen-1-ol and 3-methyl-3-buten-1-ol; monomers having a sulfonic group such as ethylenesulfonic acid, allylsulfonic acid, methallylsulfonic acid and 2-acrylamide-2-methylpropanesulfonic acid; cationic-group-containing monomers such as vinyloxyethyltrimethylammonium chloride, vinyloxybutyltrimethylammonium chloride, vinyloxyethyldimethylamine, vinyloxymethyldiethylamine, N-acrylamide methyltrimethylammonium chloride, N-acrylamide ethyltrimethylammonium chloride, N-acrylamide dimethylamine, allyltrimethylammonium chloride, methallyltrimethylammonium chloride, dimethylallylamine and allylethylamine; and monomers having a silyl group such as vinyltrimethoxysilane, vinylmethyldimethoxysilane, vinyldimethylmethoxysilane, vinyltriethoxysilane, vinylmethyldiethoxysilane, vinyldimethylethoxysilane, 3-(meth)acrylamide-propyltrimethoxysilane and 3-(meth)acrylamide-propyltriethoxysilane. The amounts of such a vinyl ester monomer and a copolymerizable monomer, which depend on their intended use, application and so on, are generally 20 mol % or less, preferably 10 mol % or less.

A polyvinyl ester produced by the above process can be saponified in an alcohol solvent, to give a PVA.

A saponification degree of a PVA used for production of a polyvinyl acetal is preferably 80 to 99.9 mol %, more preferably 82 to 99.7 mol %, further preferably 85 to 99.5 mol %, particularly preferably 87 to 99.3 mol %. If a saponification degree of a PVA is less than 80 mol %, foreign materials (undissolved materials) in an interlayer film for a laminated glass may increase, and discoloration resistance of the interlayer film may be deteriorated. If the saponification degree is more than 99.9 mol %, a PVA may not be stably produced.

A PVA can contain an alkali metal salt of a carboxylic acid, and its content in terms of a mass of the alkali metal is preferably 0.50% by mass or less, more preferably 0.37% by mass or less, further preferably 0.28% by mass or less, particularly preferably 0.23% by mass or less. If a content of an alkali metal salt of a carboxylic acid in a PVA is more than 0.50% by mass, a laminated glass interlayer film may tend to be discolored. A content of an alkali metal salt of a carboxylic acid (in terms of a mass of the alkali metal) can be determined from the amount of an alkali metal ion as measured by ICP emission spectrometry of an ash obtained by ashing a PVA in a platinum crucible.

A catalyst for a saponification reaction of a polyvinyl ester is generally an alkaline substance such as alkali metal hydroxides such as potassium hydroxide and sodium hydroxide; and alkali metal alkoxides such as sodium methoxide. The amount of the alkaline substance is preferably within the range of 0.002 to 0.2, particularly preferably within the range of 0.004 to 0.1, as a molar ratio based on the vinyl ester monomer unit in the polyvinyl ester. The saponification catalyst can be added in one portion at the initiation of the saponification reaction, or it can be added in part at the initiation of the saponification reaction, followed by adding the remaining part in the course of the saponification reaction.

Examples of a solvent used in the saponification reaction include methanol, methyl acetate, dimethyl sulfoxide, diethyl sulfoxide and dimethylformamide. Among these solvents, methanol is preferably used. In its use, a water content of methanol is adjusted preferably to 0.001 to 1% by weight, more preferably 0.003 to 0.9% by weight, particularly preferably 0.005 to 0.8% by weight.

The saponification reaction is conducted preferably at a temperature of 5 to 80° C., more preferably 20 to 70° C. A time needed for the saponification reaction is preferably 5 min to 10 hours, more preferably 10 min to 5 hours. The saponification reaction can be conducted either in batch style or in a continuous process. At the end of the saponification reaction, the remaining saponification catalyst can be, if necessary, neutralized. Examples of a neutralizing agent which can be used include organic acids such as acetic acid and lactic acid and ester compounds such as methyl acetate.

The alkaline substance containing an alkali metal which is added in the saponification reaction is generally neutralized by an ester such as methyl acetate which generates with progression of the saponification reaction, or neutralized by a carboxylic acid such as acetic acid added. Here, an alkali metal salt of the carboxylic acid such as sodium acetate is formed. As described above, a starting PVA preferably contain a predetermined amount of an alkali metal salt of a carboxylic acid.

For reduction of an alkali metal salt and so on, a PVA after saponification can be washed with a washing liquid containing a lower alcohol such as methanol. The washing liquid can contain water in 20 parts by mass or less based on 100 parts by mass of the lower alcohol. The washing liquid can contain an ester such as methyl acetate which generates in the saponification process. Here, a content of such an ester is preferably, but not limited to, 1,000 parts by mass or less based on 100 parts by mass of the lower alcohol. The amount of a washing liquid used for washing is preferably 100 parts by mass to 10,000 parts by mass, more preferably 150 parts by mass to 5,000 parts by mass, further preferably 200 parts by mass to 1,000 parts by mass based on 100 parts by mass of a gelled PVA swollen with an alcohol. If the amount of the washing liquid is less than 100 parts by mass, the amount of an alkali metal salt of a carboxylic acid may be over the above range. Meanwhile, if the amount of the washing liquid is over 10,000 parts by mass, such increase of the amount does not contribute to improving washing effect. There are no particular restrictions to washing method; for example, a batch style can be employed, in which a PVA (swollen gel) and a washing liquid are charged in a chamber and stirred or left at 5 to 100° C. for about 5 min to 180 min for deliquoring, and the process is repeated until a content of an alkali metal salt of a carboxylic acid becomes within the above range. Alternatively, a continuous process can be employed, in which at the substantially same temperature and for the substantially same period as the batch style, a PVA is continuously fed from a tower top while a washing liquid is continuously fed from a tower bottom to contact and mix them.

An alkali metal salt of a carboxylic acid which may be contained in a PVA can be a salt produced by neutralizing an alkali catalyst used in the above saponification process such as sodium hydroxide, potassium hydroxide and sodium methoxide with a carboxylic acid; a salt produced by neutralization of a carboxylic acid in a saponification process which is added for preventing alcoholysis of a starting vinyl ester monomer such as vinyl acetate used in a polymerization process; a salt produced by neutralization of a carboxylic acid having a conjugated double bond in a saponification process when the carboxylic acid is used as an inhibitor added for terminating radical polymerization; a salt intentionally added; or the like. Specific examples include, but not limited to, sodium acetate, potassium acetate, sodium propionate, potassium propionate, sodium glycerate, potassium glycerate, sodium malate, potassium malate, sodium citrate, potassium citrate, sodium lactate, potassium lactate, sodium tartate, potassium tartate, sodium salicylate, potassium salicylate, sodium malonate, potassium malonate, sodium succinate, potassium succinate, sodium maleate, potassium maleate, sodium phthalate, potassium phthalate, sodium oxalate, potassium oxalate, sodium glutarate, potassium glutarate, sodium abietate, potassium abietate, sodium sorbate, potassium sorbate, sodium 2,4,6-octatriene-1-carboxylate, potassium 2,4,6-octatriene-1-carboxylate, sodium eleostearate, potassium eleostearate, sodium 2,4,6,8-decatetraene-1-carboxylate, potassium 2,4,6,8-decatetraene-1-carboxylate, sodium retinoate and potassium retinoate.

A PVA thus produced is acetalized to afford a polyvinyl acetal used for production of an interlayer film for a laminated glass. There are no particular restrictions to the acetalization process, but it can be, for example, the following process. A PVA is heated to 80 to 100° C. to be dissolved in water and then is gradually cooled over 10 to 60 min, to give a PVA aqueous solution having a concentration of 3 to 40% by mass. At the time when the temperature is lowered to −10 to 30° C., an aldehyde and an acid catalyst are added to the aqueous solution. Maintaining the solution at a certain temperature, an acetalization reaction is carried out for 30 to 300 min. During the reaction, a polyvinyl acetal whose acetalization degree has reached a certain level is deposited. Then, the reaction solution is warmed to 25 to 80° C. over 30 to 300 min, and the temperature is maintained for 10 min to 25 hours (this temperature is referred to as a reaction temperature in the last stage). Subsequently, a neutralizing agent such as an alkali is, if necessary, added to the reaction solution to neutralize the acid catalyst, and then a deposit obtained is washed with water and dried to give a polyvinyl acetal.

Generally, in such a reaction or processing, agglomerated particles of a polyvinyl acetal generate, so that coarse particles tend to be formed. Generation of such coarse particles may cause dispersion between batches. In contrast, when a specific PVA described below is used as a starting material, generation of coarse particles is suppressed in comparison with a conventional product. As a result, when a polyvinyl acetal obtained is melt-formed into a film, an interlayer film for a laminated glass with less foreign materials (undissolved materials) can be provided.

There are no particular restrictions to an acid catalyst used for the acetalization reaction, and any organic or inorganic acid can be used; examples include acetic acid, para-toluenesulfonic acid, nitric acid, sulfuric acid and hydrochloric acid. Among these, hydrochloric acid, sulfuric acid and nitric acid can be preferably used. When nitric acid is used, the acetalization reaction is generally accelerated so that productivity can be improved, while particles of a polyvinyl acetal obtained tend to be coarse, leading to increase in dispersion between batches. In contrast, when a specific PVA is used as a starting material, generation of coarse particles is suppressed. As a result, when a polyvinyl acetal obtained is melt-formed into a film, an interlayer film for a laminated glass with less foreign materials (undissolved materials) can be provided.

An aldehyde used for the acetalization reaction of a polyvinyl acetal is, but not limited to, preferably a conventionally known aldehyde having 1 to 8 carbon atoms, more preferably an aldehyde having 4 to 6 carbon atoms, particularly preferably n-butylaldehyde. In the present invention, a polyvinyl acetal produced using a combination of two or more aldehydes can be used.

In the present invention, each value as determined by GPC measurement of an interlayer film for a laminated glass can be adjusted within the above range by, for example, 1) adding an antioxidizing agent to a polyvinyl acetal followed by forming a film, and 2) using a specific PVA as a starting material of a polyvinyl acetal used for producing an interlayer film for a laminated glass. These methods can be combined as appropriate.

For example, the antioxidizing agent used in the method in 1) can be, but not limited to, a phenolic antioxidizing agent, a phosphorous antioxidizing agent and a sulfur antioxidizing agent, preferably a phenolic antioxidizing agent, particularly preferably an alkyl-substituted phenolic antioxidizing agent.

Examples of a phenolic antioxidizing agent include acrylates such as 2-t-butyl-6-(3-t-butyl-2-hydroxy-5-methylbenzyl)-4-methylphenyl acrylate and 2,4-di-t-amyl-6-(1-(3,5-di-t-amyl-2-hydroxyphenyl)ethyl)phenyl acrylate, alkyl-substituted phenolic compounds such as 2,6-di-t-butyl-4-methylphenol, 2,6-di-t-butyl-4-ethylphenol, octadecyl-3-(3,5-)di-t-butyl-4-hydroxyphenyl) propionate, 2,2'-methylene-bis(4-methyl-6-t-butylphenol), 4,4'-butylidene-bis(4-methyl-6-t-butylphenol), 4,4'-butylidene-bis(6-t-butyl-m-cresol), 4,4'-thiobis(3-methyl-6-t-butylphenol), bis(3-cyclohexyl-2-hydroxy-5-methylphenyl)methane, 3,9-bis(2-(3-(3-t-butyl-4-hydroxy-5-methylphenyl)propionyloxy)-1,1-dimethylethyl)-2,4,8,10-tetraoxaspiro[5.5]undecane, 1,1,3-tris(2-methyl-4-hydroxy-5-t-butylphenyl)butane, 1,3,5-trimethyl-2,4,6-tris(3,5-di-t-butyl-4-hydroxybenzyl) benzene, tetrakis(methylene-3-(3',5'-di-t-butyl-4'-hydroxyphenyl)propionate)methane and triethyleneglycol bis(3-(3-t-butyl-4-hydroxy-5-methylphenyl)propionate); triazine-containing phenolic compounds such as 6-(4-hydroxy-3,5-di-t-butylanilino)-2,4-bis-octylthio-1,3,5-triazine, 6-(4-hydroxy-3,5-dimethylanilino)-2,4-bis-octylthio-1,3,5-triazine, 6-(4-hydroxy-3-methyl-5-t-butylanilino)-2,4-bis-octylthio-1,3,5-triazine and 2-octylthio-4,6-bis-(3,5-di-t-butyl-4-oxyanilino)-1,3,5-triazine.

Examples of a phosphorous antioxidizing agent include monophosphite compounds such as triphenyl phosphite, diphenyl isodecyl phosphite, phenyl diisodecyl phosphite, tris(nonylphenyl) phosphite, tris(dinonylphenyl) phosphite, tris(2-t-butyl-4-methylphenyl) phosphite, tris(cyclohexylphenyl) phosphite, 2,2-methylenebis(4,6-di-t-butylphenyl) octyl phosphite, 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide and 10-decyloxy-9,10-dihydro-9-oxa-10-phosphaphenanthrene; and diphosphite compounds such as 4,4'-butylidene-bis(3-methyl-6-t-butylphenyl di-tridecyl phosphite), 4,4'-isopropylidene-bis(phenyl-dialkyl(C12 to C15) phosphite), 4,4'-isopropylidene-bis(diphenyl monoalkyl(C12 to C15) phosphite), 1,1,3-tris(2-methyl-4-di-tridecyl phosphite-5-t-butylphenyl)butane, tetrakis(2,4-di-t-butylphenyl)-4,4'-biphenylene phosphite. Among others, a monophosphite compound is preferable.

Examples of a sulfur antioxidizing agent include dilauryl 3,3'-thiodipropionate, distearyl 3,3'-thiodipropionate, lauryl stearyl 3,3'-thiodipropionate, pentaerythritol-tetrakis-(β-lauryl-thiopropionate) and 3,9-bis(2-dodecylthioethyl)-2,4,8,10-tetraoxaspiro[5.5]undecane.

These antioxidizing agents can be used alone or in combination of two or more. The amount of an antioxidizing agent is, but not limited to, within the range of 0.001 to 5 parts by mass, preferably within the range of 0.01 to 1 parts by mass, based on 100 parts by mass of a polyvinyl acetal. If the amount of an antioxidizing agent is less than 0.001 parts by mass, it may not be sufficiently effective, while if the amount is more than 5 parts by mass, such increase of the amount does not contribute to improving its effect.

A PVA used in the method in 2) can be, for example, any of A) to H).

A) A vinyl ester monomer in which a radical polymerization inhibitor contained in a starting vinyl ester monomer has been preliminarily removed is used for polymerization.

B) A vinyl ester monomer in which the total content of impurities contained in a starting vinyl ester monomer is preferably 1 to 1200 ppm, more preferably 3 to 1100 ppm, further preferably 5 to 1000 ppm is used for radical polymerization. Examples of an impurity include aldehydes such as acetaldehyde, crotonaldehyde and acrolein; acetals such as acetaldehyde dimethyl acetal, crotonaldehyde dimethyl acetal and acrolein dimethyl acetal which are products of acetalization of the above aldehydes by the alcohol solvent; ketones such as acetone; and esters such as methyl acetate and ethyl acetate.

C) In a sequence of processes where a starting vinyl ester monomer is radically polymerized in an alcohol solvent and the unreacted monomer is recycled, for preventing alcoholysis or hydrolysis of a monomer by an alcohol or trace amounts of water, an organic acid including hydroxycarboxylic acids such as glycolic acid, glyceric acid, malic acid, citric acid, lactic acid, tartaric acid and salicylic acid; and polycarboxylic acids such as malonic acid, succinic acid, maleic acid, phthalic acid, oxalic acid and glutaric acid is added for inhibiting generation of an aldehyde such as acetaldehyde as a decomposition product as much as possible. The amount of such an organic acid is preferably 1 to 500 ppm, more preferably 3 to 300 ppm, further preferably 5 to 100 ppm, based on the starting vinyl ester monomer.

D) A solvent used for polymerization is a solvent with an impurity content of preferably 1 to 1200 ppm, more preferably 3 to 1100 ppm, further preferably 5 to 1000 ppm in total. Impurities contained in the solvent can be those described above as impurities contained in a starting vinyl ester monomer.

E) In radical polymerization of a vinyl ester monomer, a ratio of a solvent to the vinyl ester monomer is increased.

F) An organic peroxide is used as a radical polymerization initiator used for radical polymerization of a vinyl ester monomer. Examples of an organic peroxide include acetyl peroxide, isobutyl peroxide, diisopropyl peroxycarbonate, diallyl peroxydicarbonate, di-n-propyl peroxydicarbonate, dimyristyl peroxydicarbonate, di(2-ethoxyethyl) peroxydicarbonate, di(2-ethylhexyl) peroxydicarbonate, di(methoxyisopropyl) peroxydicarbonate and di(4-tert-butylcyclohexyl) peroxydicarbonate. In particular, a peroxydicarbonate with a half life of 10 to 100 min at 60° C. is preferably used.

G) When an inhibitor is added for inhibiting polymerization after radical polymerization of a vinyl ester monomer, the inhibitor is added in an amount of 5 molar equivalents or less to the remaining undecomposed radical polymerization initiator. The inhibitor can be a compound having a conjugated double bond with a molecular weight of 1,000 or less which can stabilize a radical for inhibiting a polymerization reaction. Specific examples include polyenes including conjugated dienes having a conjugation structure of two carbon-carbon double bonds such as isoprene, 2,3-dimethyl-1,3-butadiene, 2,3-diethyl-1,3-butadiene, 2-t-butyl-1,3-butadiene, 1,3-pentadiene, 2,3-dimethyl-1,3-pentadiene, 2,4-dimethyl-1,3-pentadiene, 3,4-dimethyl-1,3-pentadiene, 3-ethyl-1,3-pentadiene, 2-methyl-1,3-pentadiene, 3-methyl-1,3-pentadiene, 4-methyl-1,3-pentadiene, 1,3-hexadiene, 2,4-hexadiene, 2,5-dimethyl-2,4-hexadiene, 1,3-octadiene, 1,3-cyclopentadiene, 1,3-cyclohexadiene, 1-methoxy-1,3-butadiene, 2-methoxy-1,3-butadiene, 1-ethoxy-1,3-butadiene, 2-ethoxy-1,3-butadiene, 2-nitro-1,3-butadiene, chloroprene, 1-chloro-1,3-butadiene, 1-bromo-1,3-butadiene, 2-bromo-1,3-butadiene, fulvene, tropone, ocimene, phellandrene, myrcene, farnecene, cembrene, sorbic acid, a sorbic acid ester, a sorbic acid salt and abietic acid; conjugated trienes having a conjugation structure of three carbon-carbon double bonds such as 1,3,5-hexatriene, 2,4,6-octatriene-1-carboxylic acid, eleostearic acid, tung oil and cholecalciferol, conjugated polyenes having a conjugation structure of four or more carbon-carbon double bonds such as cyclooctatetraene, 2,4,6,8-decatetraene-1-carboxylic acid, retinol and retinoic acid. Here, for compounds having a plurality of stereoisomers such as 1,3-pentadiene, myrcene and farnesene, all of the stereoisomers can be used. Further examples include aromatic compounds such as p-benzoquinone, hydroquinone, hydroquinone monomethyl ether, 2-phenyl-1-propene, 2-phenyl-1-butene, 2,4-diphenyl-4-methyl-1-pentene, 3,5-diphenyl-5-methyl-2-heptene, 2,4,6-triphenyl-4,6-dimethyl-1-heptene, 3,5,7-triphenyl-5-ethyl-7-methyl-2-nonene, 1,3-diphenyl-1-butene, 2,4-diphenyl-4-methyl-2-pentene, 3,5-diphenyl-5-methyl-3-heptene, 1,3,5-triphenyl-1-hexene, 2,4,6-triphenyl-4,6-dimethyl-2-heptene, 3,5,7-triphenyl-5-ethyl-7-methyl-3-nonene, 1-phenyl-1,3-butadiene and 1,4-diphenyl-1,3-butadiene.

H) A saponification reaction is conducted using an alcohol solution of a polyvinyl ester in which a remaining vinyl ester monomer has been removed as much as possible. A polyvinyl ester with a remaining-monomer removal rate of preferably 99% or more, more preferably 99.5% or more, further preferably 99.8% or more, is used.

The above A) to H) can be appropriately combined to afford a desired PVA. Preferably, a polyvinyl acetal produced by acetalizing a PVA thus produced is used as a starting material for an interlayer film for a laminated glass.

Light-diffusing fine particles contained in an interlayer film for a laminated glass of the present invention can be either or both of inorganic light-diffusing fine particles and organic light-diffusing fine particles in which a difference absolute value between a refractive index of the composition constituting an interlayer film for a laminated glass of the present invention free from the light-diffusing fine particles (hereinafter, sometimes abbreviated as a "base material for an interlayer film for a laminated glass") and a refractive index of the light-diffusing fine particles is large. A difference absolute value between a refractive index of the light-diffusing fine particles and a refractive index of the base material for an interlayer film for a laminated glass is 0.20 or more, more preferably 0.40 or more, furthermore 0.60 or more. If the difference absolute value is less than 0.20, an irradiated light may be inadequately diffused. There are no particular restrictions to the upper limit of a difference absolute value between a refractive index of the light-diffusing fine particles and a refractive index of the base material for an interlayer film for a laminated glass, but in the light of reducing haze in a laminated glass obtained, it is preferably 3.0 or less, more preferably 2.0 or less.

Examples of the above inorganic light-diffusing fine particles include calcium sulfate; barium sulfate; metal oxides such as titanium oxide, aluminum oxide, magnesium oxide and zinc oxide; and inorganic compounds such as aluminum hydroxide, silica, glass, talc, mica and white carbon, which can be surface-processed with a fatty acid or the like. Examples of organic light-diffusing fine particles include, for example, acrylic polymer particles, styrene polymer particles, silicone polymer particles and fluoropolymer particles. Among these light-diffusing fine particles, preferred are inorganic light-diffusing fine particles, more preferably metal oxides, further preferably titanium oxide or zinc oxide, particularly preferably titanium oxide. These can be used alone or in combination of two or more.

An average particle size of light-diffusing fine particles is preferably 10 μm or less, more preferably 5 μm or less, further preferably 2 μm or less. If the average particle size is more than 10 μm, the light-diffusing fine particles are visually observed, resulting in bad appearance. There are no particular restrictions to the lower limit of an average particle size, but in the light of light-diffusing properties, it is preferably 0.20 μm or more, more preferably 0.25 μm or more. The shape of light-diffusing fine particles can be, but not limited to, spherical, globular, elliptical, columnar, pyramidal, spindle, platy, needle, star-shaped, hollow and amorphous. Here, the term, "average particle size" as used herein refers to a volume-based average size as determined by a laser diffraction particle size distribution measurement method.

A content of light-diffusing fine particles is preferably within the range of 0.001 to 0.040% by mass, more preferably 0.002 to 0.030% by mass, further preferably 0.003 to 0.025% by mass, particularly preferably 0.004 to 0.020% by mass of a composition constituting an interlayer film for a laminated glass. If a content of light-diffusing fine particles is less than 0.001% by mass of a composition constituting an interlayer film for a laminated glass, a laminated glass produced using the interlayer film may have unsatisfactory light-diffusing properties. If a content of light-diffusing fine particles is more than 0.040% by mass of a composition constituting an interlayer film for a laminated glass, transparency of a laminated glass produced using the interlayer film may be insufficient.

An interlayer film for a laminated glass of the present invention preferably contains a plasticizer. There are no particular restrictions to the above plasticizer, as long as it does not impair the effect of the present invention and is satisfactorily compatible with a polyvinyl acetal. The above plasticizer can be a monoester or diester of an oligoalkylene glycol having hydroxy groups at both ends with a carboxylic acid, or a diester of a dicarboxylic acid with a hydroxy-containing compound. These can be used alone or in combination of two or more. Examples of an oligoalkylene glycol having hydroxy groups at both ends include ethylene glycol, diethylene glycol, triethylene glycol, tetraethylene glycol, 1,2-propylene glycol, 1,2-propylene glycol dimer and turner, 1,3-propylene glycol, 1,3-propylene glycol dimer and trimer, 1,2-butylene glycol, 1,2-butylene glycol dimer and trimer, 1,4-butylene glycol, 1,4-butylene glycol dimer and trimer, 1,2-hexanediol, 1,6-hexanediol, 3-methyl-1,5-pentanediol, 1,2-octanediol, 1,8-octanediol, 1,9-nonanediol, 2-methyl-1,8-octanediol, 1,2-decanediol and 1,4-cyclohexanediol. Examples of a carboxylic acid include acetic acid, propanoic acid, butanoic acid, pentanoic acid, hexanoic acid, heptanoic acid, octanoic acid, 2-ethylhexanoic acid, nonanoic acid and decanoic acid. Here, any combination of an oligoalkylene glycol with a carboxylic acid can be used. Among these, a monoester or diester of triethylene glycol with 2-ethylhexanoic acid is preferable in the light of handleability (volatility during molding). Examples of a dicarboxylic acid include alkylene dicarboxylic acids such as oxalic acid, malonic acid, succinic acid, glutaric acid, adipic acid, pimelic acid, suberic acid and sebacic acid, and aromatic dicarboxylic acids such as phthalic acid, isophthalic acid and terephthalic acid. Examples of a hydroxy-containing compound include methanol, ethanol, propanol, butanol, pentanol, hexanol, cyclohexanol, heptanol, octanol, 2-ethylhexanol, nonanol, decanol, 2-methoxyethanol, 2-ethoxyethanol, 2-propoxyethanol and 2-butoxyethanol, which form diesters with the above dicarboxylic acid compounds. Here, any combination of a dicarboxylic acid and a hydroxy-containing compound can be used.

There are no particular restrictions to a content of the above plasticizer as long as it does not impair the effect of the present invention, but it is preferably 10 to 100 parts by mass, more preferably 15 to 90 parts by mass, further preferably 20 to 80 parts by mass, based on 100 parts by mass of the polyvinyl acetal. If a content of the plasticizer is less than 10 parts by mass, an interlayer film for a laminated glass may not exhibit desired flexibility. If the content is more than 100 parts by mass, desired mechanical properties may not be achieved; in particular, penetration resistance or the like of a laminated glass may be deteriorated.

An interlayer film for a laminated glass of the present invention can contain a dispersing agent for dispersing light-diffusing fine particles without departing from the spirit of the present invention. Examples of the dispersing agent include phosphoric ester compounds, sulfuric ester compounds, polycarboxylic ester compounds and ricinoleic ester compounds.

An interlayer film for a laminated glass of the present invention can contain an ultraviolet absorber, an adhesiveness modifier, a pigment, a dye and other known additives without departing from the spirit of the present invention. Such additives will be described below.

Examples of the ultraviolet absorber include benzotriazole UV absorber such as 2-(5-methyl-2-hydroxyphenyl) benzotriazole, 2-(2-hydroxy-3,5-bis(α,α'-dimethylbenzyl) phenyl)-2H-benzotriazole, 2-(3,5-di-t-butyl-2-hydroxyphenyl)benzotriazole, 2-(3-t-butyl-5-methyl-2-hydroxyphenyl)-5-chlorobenzotriazole, 2-(3,5-di-t-butyl-5-methyl-2-hydroxyphenyl)-5-chlorobenzotriazole, 2-(3,5-di-t-amyl-2-hydroxyphenyl)benzotriazole, and 2-(2'-hydroxy-5'-t-octylphenyl)benzotriazole; hindered amine UV absorber such as 2,2,6,6-tetramethyl-4-piperidyl benzoate, bis(2,2,6, 6-tetramethyl-4-piperidyl) sebacate, bis(1,2,2,6,6-pentamethyl-4-piperidyl)-2-(3,5-di-t-butyl-4-hydroxybenzyl)-2-n-butyl malonate, and 4-(3-(3,5-di-t-butyl-4-hydroxyphenyl) propionyloxy)-1-(2-(3-(3,5-di-t-butyl-4-hydroxyphenyl) propionyloxy)ethyl)-2,2,6,6-tetramethylpiperidine; benzoate UV absorber such as 2,4-di-t-butylphenyl-3,5-di-t-butyl-4-hydroxybenzoate, and hexadecyl-3,5-di-t-butyl-4-hydroxybenzoate; malonic ester UV absorber such as [(4-methoxyphenyl)-methylene]-dimethyl malonate; and oxalic acid anilide UV absorber such as 2-ethyl-2'-ethoxy-oxalic anilide. These UV absorber can be used alone or in combination of two or more. A content of a UV absorber in an interlayer film for a laminated glass is, but not limited to, preferably within the range of 10 to 50,000 ppm, more preferably 100 to 10,000 ppm. If the content is less than 10 ppm, the agent may not be sufficiently effective. If the content is more than 50,000 ppm, increase of the content cannot lead to improvement of effects.

An interlayer film for a laminated glass of the present invention can contain an adhesiveness modifier for appropriately adjusting adhesiveness to a glass. A conventionally known adhesiveness modifier can be used, and for example, a sodium, potassium or magnesium salt of an organic acid such as acetic acid, propionic acid, butanoic acid, hexanoic acid, 2-ethylbutanoic acid and 2-ethylhexanoic acid can be used. These can be used alone or in combination of two or more. A preferable content of an adhesiveness modifier varies depending on a kind of an adhesiveness modifier, and it is preferable to generally adjust adhesion force of a produced interlayer film for a laminated glass to a glass to 3 to 10 as determined in Pummel test (described in International Publication WO 2003/033583 and others). When particularly high resistance to penetration is needed, the content is preferably adjusted to 3 to 6, and when higher glass shatterproof properties are needed, the content is preferably adjusted to 7 to 10. When higher glass shatterproof properties are required, absence of an adhesiveness modifier is also useful approach. In general, a content of an adhesiveness modifier in the interlayer film for a laminated glass is preferably 0.0001 to 1% by mass, more preferably 0.0005 to 0.1% by mass, further preferably 0.001 to 0.03% by mass.

Another additive for adjusting adhesiveness described above is a silane coupling agent. A content of a silane coupling agent in an interlayer film for a laminated glass is preferably 0.01 to 5% by mass.

There are no particular restrictions to a glass-transition temperature of an interlayer film for a laminated glass of the present invention. It can appropriately vary, depending on a purpose, and it is preferably within the range of 0 to 50° C., more preferably 0 to 45° C., further preferably 0 to 40° C.

A thickness of an interlayer film for a laminated glass of the present invention is, but not limited to, preferably 0.05 to 5.0 mm, more preferably 0.1 to 2.0 mm.

There are no particular restrictions to a process for producing an interlayer film for a laminated glass of the present invention, and preferred is a process wherein a PVA is acetalized to give a polyvinyl acetal and a composition containing the polyvinyl acetal, a light-diffusing fine particles and as necessary a plasticizer or other component is prepared and then melt-molded. The above melt-molding process is preferably a process wherein the polyvinyl acetal obtained, light-diffusing fine particles, a plasticizer and other components are melt-kneaded using an extruder, followed by film forming. There are no particular restrictions to a method for dispersing light-diffusing fine particles in an interlayer film for a laminated glass of the present invention, and it is preferably a method wherein a dispersion of light-diffusing fine particles in a plasticizer is added to a polyvinyl acetal resin. The dispersion can contain, as necessary, a dispersing agent. There are no particular restrictions to a method for dispersing the above light-diffusing fine particles in a plasticizer, and a composition containing the light-diffusing fine particles, a plasticizer and other components is dispersion-processed using a device such as a bead mill, a ball mill, a sand mill, a homogenizer, an attritor, a high-speed agitator and an ultrasonic dispersing apparatus. A resin temperature during extrusion is preferably 150 to 250° C., more preferably 170 to 230° C. If a resin temperature is too high, a polyvinyl acetal is decomposed, leading to increase of volatile substances contained in an interlayer film after film forming. If the temperature is too low, volatile substances cannot be sufficiently removed by an extruder, resulting in increase of volatile substances in an interlayer film after film forming. For efficiently removing volatile substances, it is preferable to remove volatile substances from a vent port by reducing the pressure in the extruder. An interlayer film for a laminated glass of the present invention can be also produced by a process wherein a solution or dispersion of a polyvinyl acetal, light-diffusing fine particles, a plasticizer and other components in an organic solvent is used to form a film and then the organic solvent is distilled off.

There are no particular restrictions to the surface shape of the above interlayer film for a laminated glass. In the light of handleability (bubble removability) during lamination with a glass, it is preferable that an uneven structure such as melt fracturing and embossing is formed on the surface to be contacted with a glass by a conventionally known method. An emboss height is, but not limited to, preferably 5 µm to 500 µm, more preferably 7 µm to 300 µm, further preferably 10 µm to 200 µm. If the emboss height is less than 5 µm, bubbles formed between a glass and an interlayer film during lamination with a glass may not be efficiently removed and if it is more than 500 µm, emboss formation is difficult. One or both sides of the interlayer film can be embossed, and in general, it is preferable to emboss both sides. An emboss pattern may be regular or irregular.

Such an emboss pattern can be formed by, as known conventionally, employing an emboss roll method, profile extrusion, extrusion lip embossing utilizing melt fracturing and so on. In particular, for stably forming an embossed interlayer film for a laminated glass on which fine uneven structure is uniformly formed, an emboss roll method is suitable.

An emboss roll used in an emboss roll method can be produced by using an engraved mill (mother mill) having a desired uneven pattern to transfer the uneven pattern to the surface of the metal roll. Alternatively, an emboss roll can be produced using laser etching. Furthermore, after an uneven fine pattern is formed on the roll surface as described above, the surface can be blasted using an abrasive such as aluminum oxide, silicon oxide and glass beads to form a further finer uneven pattern.

An emboss roll used in an emboss roll method is preferably processed to make it mold-releasable. If a roll without being conducted a releasing process is used, a trouble of difficulty in releasing an interlayer film for a laminated glass from a roll tends to occur. The releasing process can be conducted by conventionally known technique such as silicone treatment, Teflon® treatment and plasma treatment.

Herein, as a starting polyvinyl acetal for an interlayer film for a laminated glass, only a virgin resin (resin free from a recycled polyvinyl acetal) can be used for forming a film, or alternatively trims or off-specification products described below can be recycled for forming a film. In general, a film is formed using, for example, a film-formation apparatus comprising an extruder equipped with a weighing machine such as a gear pump and a die such as a T-die. Generally, when an interlayer film for a laminated glass or the like is used for forming a film, both ends (trims) of the interlayer film for a laminated glass are removed. In the light of energy saving, effective utilization of sources and improvement in an yield, it is very important to recover and recycle such trims. Off-specification products with an irregular surface generated in an interlayer film for a laminated glass are also useful as are trims because they can be recycled. An interlayer film for a laminated glass of the present invention generates less amount of foreign materials (undissolved materials) in melt film-forming. Furthermore, an interlayer film for a laminated glass of the present invention is less discolored under heating, so that the recovered interlayer film for a laminated glass (trims and an off-specification interlayer film for a laminated glass) can be efficiently recycled. The recovered interlayer film for a laminated glass can be reloaded in an extruder by, for example, directly winding-off trims or off-specification products of an interlayer film for a laminated glass winded as a roll, into an extruder; or by cutting trims or off-specification products of an interlayer film for a laminated glass winded as a roll, into pieces with a certain size, which are then reloaded in an extruder. In forming a film from an interlayer film for a laminated glass of the present invention, a ratio of a virgin resin to a recovered interlayer film for a laminated glass in a raw material (virgin resin:recovered interlayer film for a laminated glass) can vary, as appropriate, within the range of 0:100 to 100:0.

When the above trims or off-specification products of an interlayer film for a laminated glass are recycled for producing an interlayer film for a laminated glass, contents of light-diffusing fine particles, a plasticizer, and other components can be adjusted by the following method. Specifically, a desired interlayer film for a laminated glass can be produced by regulating the amounts of individual components added to an extruder while analyzing the components constituting the interlayer film for a laminated glass obtained.

A laminated glass in which a plurality of glass sheets are bonded via the above interlayer films for a laminated glass is a suitable embodiment of the present invention. The laminated glass can be produced by sandwiching the above interlayer film between at least two glass sheets and bonding the interlayer film by heating. There are no particular restrictions to a glass used for the above laminated glass, and examples include inorganic glasses such as a float plate glass, a tempered plate glass, a polished plate glass, a figured glass, a wire-reinforced plate glass and a heat-absorbing plate glass and conventionally known organic glasses such as polymethyl methacrylate and polycarbonate. These can be either colorless or colored. In the light of transparency of a laminated glass produced, these glasses preferably has a haze as measured in accordance with JIS K 7105 of 20% or less. Here, the same type or different types of glasses can be laminated. A thickness of the glass is, but not limited to, preferably 100 mm or less. There are no particular restrictions to the shape of the above glass, and the glass can be a simple flat plate glass and a glass having curvature such as an automobile sun roof glass.

In an interlayer film for a laminated glass of the present invention, in the light of transparency, a haze as measured in accordance with JIS K 7105 for a laminated glass prepared by sandwiching the interlayer film for a laminated glass between two glass sheets with a thickness of 3 mm is 20% or less, more preferably 17.5% or less, further preferably 15% or less. There are no particular restrictions to the lower limit to a haze, and it is preferably 3% or more. If the lower limit is less than 3%, irradiated light may be insufficiently diffused. A glass sheet used for measurement generally has a haze of 20% or less as one sheet.

The above laminated glass can be produced by a conventionally known method such as a method using a vacuum laminator, a method using a vacuum bag, a method using a vacuum ring and a method using a nip roll. Alternatively, after temporary pressure bonding using such a method, a laminate obtained can be placed in an autoclave.

When a vacuum laminator is used, glasses and interlayer films are laminated, for example, under a reduced pressure of $1 \times 10^{-6}$ to $3 \times 10^{-2}$ MPa at 100 to 200° C., particularly 130 to 160° C. A method using a vacuum bag or vacuum ring is described in, for example, EP Patent No. 1235683, and for example, lamination is conducted under a pressure of about $2 \times 10^2$ MPa at a temperature of 130 to 145° C.

A production method using a nip roll can be a method where a material is degassed by a roll at a temperature equal to or lower than a flow initiation temperature of an interlayer film for a laminated glass and then pressure-bonded at a temperature around the flow initiation temperature. Specifically, the material is heated to 30 to 70° C. by, for example, an infrared heater, degassed by a roll, heated to 50 to 120° C. and then pressure-bonded by a roll.

When the material is subjected to temporary pressure bonding using such a method, followed by placing a laminate obtained in an autoclave for further pressure bonding, the operation conditions of the autoclave process can be appropriately chosen, depending on a thickness and a configuration of a laminated glass, and for example, preferably, the material is processed under a pressure of 1.0 to 1.5 MPa at a temperature of 130 to 145° C. for 0.5 to 3 hours.

A laminated glass of the present invention produced by the above process can be used as a light diffusion plate because it is excellent in penetration resistance, transparency and light-diffusing properties. For example, it can be suitably used for applications such as a light shielding plate as a window material utilizing its property that when a source light is OFF, it is transparent while when a source light is ON, it is opaque due to diffused light in a planar direction, and a light-emitting plate such as illumination, a decoration plate, a billboard and a sign, as well as a building material, an interior material, a member for a transport machinery such as an automobile and an airplane, a member for an electric device and a member for an electronic device.

When a laminated glass of the present invention is used as the above member for a transport machinery, a specific application is a sun roof panel. A sun roof is an opening in the roof of a transport machinery, in particular an automobile, and a sun roof panel which is a part of the sun roof is made of a transparent material and acts as a day lighting section. When being used as a sun roof panel, a laminated glass of the present invention ensures safety and has excellent designability.

EXAMPLES

The present invention will be further detailed with reference to, but not limited to, Examples. In the examples below, "%" and "part(s)" denote "% by mass" and "part(s) by mass", respectively, unless otherwise stated.

[GPC Measurement]
(Measuring Apparatus)

GPC measurement was conducted using "GPC max" from VISCOTECH Co. Ltd. A differential refractive index detector was "TDA305" from VISCOTECH Co. Ltd. An ultraviolet-visible absorptiometer was "UV Detector 2600" from VISCOTECH Co. Ltd. An optical path length of a detection cell in the absorptiometer was 10 mm. A GPC column was "GPC HFIP-806M" from Showa Denko K. K. An analysis software was OmniSEC (Version 4.7.0.406) attached to the apparatus.

(Measurement Conditions)

A sample was dissolved in HFIP containing sodium trifluoroacetate in 20 mmol/L, to prepare a sample solution (concentration: 1.00 mg/mL). The supernatant of the solution was collected and filtered through a 0.45 μm polytetrafluoroethylene filter before measurement.

A mobile phase was HFIP with 20 mmol/L sodium trifluoroacetate. A flow rate of the mobile phase was 1.0 mL/min. In the measurement, a sample injection volume was 100 μL and a GPC column temperature was 40° C.

For a sample with a PVA viscosity-average degree of polymerization of more than 2,400, GPC measurement was conducted using an appropriately diluted sample (100 μL). From an observed value, an absorbance at a sample concentration of 1.00 mg/mL was calculated by the following formula. "a" (mg/mL) is a concentration of the diluted sample.

$$\text{Absorbance at a sample concentration of 1.00 mg/mL} = (1.00/\alpha) \times \text{a measured absorbance}$$

(Preparation of a Calibration Curve)

GPC measurement was conducted for monodisperse PMMAs (peak-top molecular weight: 1944000, 790000, 467400, 271400, 144000, 79250, 35300, 13300, 7100, 1960, 1020, 690) from Agilent Technologies as standards to prepare calibration curves for converting an elution volume into a PMMA molecular weight for a differential refractive index detector and an absorptiometer, respectively. For preparing each calibration curve, the above analysis software was used. In measurement of a PMMA in this measurement, a column capable of separating the peaks of standard samples with a molecular weight of 1,944,000 and 271,400, respectively, was used.

In this apparatus, a signal strength obtained from a differential refractive index detector is expressed in millivolt unit, and a signal strength obtained from an absorptiometer is expressed in an absorbance (absunit: absorbance unit).

[Synthesis of Polyvinyl Acetate]
PVAc-1

In a 6 liter separable flask equipped with a stirrer, a thermometer, a nitrogen inlet tube and a reflux condenser were charged 2,555 g of pre-deoxidized vinyl acetate monomer (VAM) containing 500 ppm of acetaldehyde (AA) and 50 ppm of acetaldehyde dimethyl acetal (DMA); 945 g of methanol (MeOH) containing 50 ppm of acetaldehyde dimethyl acetal with an acetaldehyde content being less than 1 ppm; a 1% solution of tartaric acid in methanol in such an amount that a content of tartaric acid in VAM was to be 20 ppm. While nitrogen is blown into the flask, an internal temperature of the flask was adjusted to 60° C. Here, in the reflux condenser, an aqueous ethylene glycol solution at −10° C. was circulated. A 0.55% by mass solution of di-n-propyl peroxydicarbonate in methanol was prepared, and 18.6 mL of the solution was added to the flask, to initiate polymerization. Here, the amount of di-n-propyl peroxydicarbonate was 0.081 g. The solution of di-n-propyl peroxydicarbonate in methanol was successively added at a rate of 20.9 mL/hr until the polymerization was completed. During the polymerization, an internal temperature of the flask was kept at 60° C. Four hours after the initiation of the polymerization, that is, at the time when a solid concentration of the polymerization solution reached 25.1%, 1,200 g of methanol containing 0.0141 g of sorbic acid (corresponding to 3 molar equivalents of the remaining undecomposed di-n-propyl peroxydicarbonate in the polymerization solution), and then the polymerization solution was cooled to terminate the polymerization. At the end of the polymerization, a polymerization degree of VAM was 35.0%. The polymerization solution was cooled to room temperature and then the inside of the flask was vacuumed using a tap aspirator to distill off VAM and methanol, resulting in precipitation of polyvinyl acetate. To the precipitated polyvinyl acetate was added 3,000 g of methanol, and the mixture was heated at 30° C. to dissolve polyvinyl acetate. Again, the inside of the flask was vacuumed using a tap aspirator to distill off VAM and methanol, resulting in precipitation of polyvinyl acetate. The procedure of dissolving the polyvinyl acetate in methanol and precipitating it was repeated two more times. Methanol was added to the precipitated polyvinyl acetate to provide a 40% by mass of methanol solution of polyvinyl acetate (PVAc-1), having a 99.8% of removal rate of VAM.

Using a part of the solution of PVAc-1 in methanol thus obtained, a polymerization degree was measured. To the solution of PVAc-1 in methanol was added a 10% solution of sodium hydroxide in methanol in such an amount that a molar ratio of sodium hydroxide to a vinyl acetate unit in the polyvinyl acetate was to be 0.1. At the time when a gelled substance was formed, the gel was crushed and soxh let-extracted into methanol for 3 days. The polyvinyl alcohol obtained was dried and subjected to measurement of a viscosity-average degree of polymerization. A polymerization degree was 1,700.

PVAc-2 to 13

Polyvinyl acetates (PVAc-2 to 13) were produced as described for PVAc-1, except the reaction was conducted under the conditions described in Table 1. In Table 1, "ND" means less than 1 ppm. A polymerization degree of each polyvinyl acetate obtained was determined as described for PVAc-1. The results are shown in Table 1.

[Synthesis and Evaluation of PVA]

PVA-1

To a 40% by mass solution of PVAc-1 polyvinyl acetate in methanol were added methanol in such an amount that a total solid concentration (saponification concentration) was to be 30% by mass and a 8% solution of sodium hydroxide in methanol in such an amount that a molar ratio of sodium hydroxide to a vinyl acetate monomer unit in the polyvinyl acetate was to be 0.020 with stirring, and a saponification reaction was initiated at 40° C. At the time when a gelled substance was formed with progress of the saponification reaction, the gel was crushed. The crushed gel was transferred into a vessel at 40° C. and after the lapse of 60 min from the initiation of the saponification reaction, was immersed in a solution of methanol/methyl acetate/water (25/70/5 by mass) for neutralization. The swollen gel obtained was collected by centrifugation and a two-fold amount of methanol to the mass of the swollen gel was added for immersion. After standing the mixture for 30 min, it was centrifuged. This procedure was repeated four times. The product was dried at 60° C. for one hour and at 100° C. for 2 hours to afford PVA-1.

A polymerization degree and a saponification degree of PVA-1 were determined in accordance with the method described in JIS-K6726. A polymerization degree was 1,700, and a saponification degree was 99.1 mol %. These physical data are also shown in Table 2.

After ashing PVA-1, the amount of sodium in the ash obtained was measured by an ICP emission spectrometer "IRIS AP" from Jarrell Ash Corporation to determine a content of sodium acetate in PVA-1. A content of sodium acetate was 0.7% (0.20% in terms of sodium). These physical data are also shown in Table 2.

PVA-2, 3, Comparative PVA-1 to 3

Each PVA was synthesized as described for PVA-1, except that the reaction was conducted under the conditions shown in Table 2. A polymerization degree, a saponification degree and a content of sodium acetate (converted to the mass of sodium) of the PVA obtained were determined as described for PVA-1. The results are shown in Table 2.

TABLE 1

| Synthesis Example | VAM (g) | MeOH (g) | Impurities in VAM | | Impurities in MeOH | | Initiator[1] | | | Polymerization time (hr) | Solid Concentration (%) | Polymerization rate (%) | Polymerization degree |
|---|---|---|---|---|---|---|---|---|---|---|---|---|---|
| | | | AA (ppm) | DMA (ppm) | AA (ppm) | DMA (ppm) | Concentration (g/L) | Initiation (mL) | Sequential (mL/hr) | | | | |
| PVAc-1 | 2555 | 945 | 500 | 50 | ND | 50 | 0.55 | 18.6 | 20.9 | 4.0 | 25.1 | 35.0 | 1700 |
| PVAc-2 | 2800 | 700 | 150 | 15 | ND | 50 | 0.30 | 10.2 | 11.5 | 4.0 | 15.8 | 20.0 | 2400 |
| PVAc-3 | 3164 | 336 | 100 | 10 | ND | 50 | 0.30 | 9.5 | 10.7 | 2.0 | 9.0 | 10.0 | 3600 |
| PVAc-4 | 2590 | 910 | 950 | 50 | ND | 100 | 0.80 | 13.0 | 14.6 | 4.0 | 25.6 | 35.0 | 1700 |
| PVAc-5 | 2520 | 980 | ND | ND | ND | ND | 0.50 | 20.2 | 22.7 | 4.0 | 24.7 | 35.0 | 1700 |
| PVAc-6 | 2660 | 840 | 1500 | 100 | 150 | 20 | 0.80 | 13.3 | 14.9 | 4.0 | 26.3 | 35.0 | 1700 |
| PVAc-7 | 2800 | 700 | ND | ND | ND | ND | 0.10 | 20.5 | 23.0 | 4.0 | 15.7 | 20.0 | 2400 |
| PVAc-8 | 2958 | 542 | 1500 | 100 | 100 | 15 | 0.20 | 14.8 | 16.6 | 4.0 | 16.7 | 20.0 | 2400 |
| PVAc-9 | 3150 | 350 | ND | ND | ND | ND | 0.30 | 9.5 | 10.6 | 2.0 | 9.0 | 10.0 | 3600 |
| PVAc-10 | 3325 | 175 | 1300 | 120 | 100 | 15 | 0.30 | 8.0 | 9.0 | 2.0 | 8.5 | 9.0 | 3600 |
| PVAc-11[2] | 3378 | 122 | 100 | 10 | ND | 50 | 0.10 | 60.8 | 18.7 | 2.0 | 4.8 | 5.0 | 5500 |
| PVAc-12 | 2293 | 1207 | 10 | 2 | ND | 5 | 0.10 | 11.0 | 12.4 | 2.0 | 3.3 | 5.0 | 1700 |
| PVAc-13 | 2275 | 1225 | 500 | 50 | ND | 50 | 0.80 | 24.2 | 27.2 | 4.0 | 28.6 | 45.0 | 1200 |

[1]Initiator: a solution of di-n-propyl peroxydicarbonate in MeOH
[2]Polymerization temperature: 50° C.

TABLE 2

| Synthesis Example | PVAc | Saponification Concentration (% by mass) | NaOH (molar ratio) | Washing[1] MeOH amount | No. | Polymerization degree | Saponification degree (mol %) | Na (% by mass) |
|---|---|---|---|---|---|---|---|---|
| PVA-1 | PVAc-1 | 30 | 0.02 | 2 | 4 | 1700 | 99.1 | 0.20 |
| PVA-2 | PVAc-4 | 30 | 0.02 | 1.5 | 3 | 1700 | 99.1 | 0.31 |
| PVA-3 | PVAc-12 | 30 | 0.02 | 2 | 4 | 1700 | 99.1 | 0.20 |
| Comparative PVA-1 | PVAc-5 | 30 | 0.02 | 2 | 4 | 1700 | 99.2 | 0.20 |
| Comparative PVA-2 | PVAc-6 | 30 | 0.02 | 2 | 4 | 1700 | 99.1 | 0.17 |
| Comparative PVA-3 | PVAc-13 | 35 | 0.022 | 2 | 4 | 1200 | 98.5 | 0.20 |

[1] The amount of MeOH used for washing of a swollen gel after neutralization (mass ratio of MeOH to the swollen gel) and washing number PVA-4, Comparative PVA-4, 5

Each PVA was synthesized as described for PVA-1, except that the reaction was conducted under the conditions shown in Table 3. A polymerization degree, a saponification degree and a content of sodium acetate (converted to the mass of sodium) of the PVA obtained were determined as described for PVA-1. The results are shown in Table 3.

TABLE 3

| PVA Synthesis Example | PVAc | Saponification Concentration (% by mass) | NaOH (molar ratio) | Washing[1] MeOH amount | No. | Polymerization degree | Saponification degree (mol %) | Na (% by mass) |
|---|---|---|---|---|---|---|---|---|
| PVA-4 | PVAc-2 | 25 | 0.018 | 2 | 4 | 2400 | 98.7 | 0.14 |
| Comparative PVA-4 | PVAc-7 | 25 | 0.018 | 2 | 4 | 2400 | 98.3 | 0.11 |
| Comparative PVA-5 | PVAc-8 | 25 | 0.018 | 2 | 4 | 2400 | 98.3 | 0.22 |

[1] The amount of MeOH used for washing of a swollen gel after neutralization (mass ratio of MeOH to the swollen gel) and washing number PVA-5, Comparative PVA-6 to 8

Each PVA was synthesized as described for PVA-1, except that the reaction was conducted under the conditions shown in Table 4. A polymerization degree, a saponification degree and a content of sodium acetate (converted to the mass of sodium) of the PVA obtained were determined as described for PVA-1. The results are shown in Table 4.

PVA-6 to 8, Comparative PVA-9 to 11

Each PVA was synthesized as described for PVA-1, except that the reaction was conducted under the conditions shown in Table 5. A polymerization degree, a saponification degree and a content of sodium acetate (converted to the mass of sodium) of the PVA obtained were determined as described for PVA-1. The results are shown in Table 5.

TABLE 4

| PVA Synthesis Example | PVAc | Saponification Concentration (% by mass) | NaOH (molar ratio) | Washing[1] MeOH amount | No. | Polymerization degree | Saponification degree (mol %) | Na (% by mass) |
|---|---|---|---|---|---|---|---|---|
| PVA-5 | PVAc-3 | 15 | 0.015 | 2 | 4 | 3600 | 98.5 | 0.17 |
| Comparative PVA-6 | PVAc-9 | 15 | 0.015 | 2 | 4 | 3600 | 98.3 | 0.11 |
| Comparative PVA-7 | PVAc-10 | 15 | 0.015 | 2 | 4 | 3600 | 98.3 | 0.22 |
| Comparative PVA-8 | PVAc-11 | 8 | 0.015 | 2 | 4 | 5500 | 99.2 | 0.22 |

[1] The amount of MeOH used for washing of a swollen gel after neutralization (mass ratio of MeOH to the swollen gel) and washing number

TABLE 5

| PVA Synthesis Example | PVAc | Saponification Concentration (% by mass) | Saponification NaOH (molar ratio) | Washing[1] MeOH amount | Washing[1] No. | Polymerization degree | Saponification degree (mol %) | Na (% by mass) |
|---|---|---|---|---|---|---|---|---|
| PVA-6 | PVAc-1 | 30 | 0.008 | 2 | 3 | 1700 | 88.2 | 0.20 |
| PVA-7 | PVAc-4 | 30 | 0.008 | 2 | 3 | 1700 | 88.3 | 0.14 |
| PVA-8 | PVAc-12 | 30 | 0.008 | 2 | 3 | 1700 | 87.8 | 0.20 |
| Comparative PVA-9 | PVAc-5 | 30 | 0.008 | 2 | 3 | 1700 | 88.2 | 0.14 |
| Comparative PVA-10 | PVAc-6 | 30 | 0.008 | 2 | 3 | 1700 | 88.1 | 0.14 |
| Comparative PVA-11 | PVAc-13 | 40 | 0.009 | 2 | 3 | 1200 | 88.0 | 0.22 |

[1] The amount of MeOH used for washing of a swollen gel after neutralization (mass ratio of MeOH to the swollen gel) and washing number PVA-9, Comparative PVA-12, 13

Each PVA was synthesized as described for PVA-1, except that the reaction was conducted under the conditions shown in Table 6. A polymerization degree, a saponification degree and a content of sodium acetate (converted to the mass of sodium) of the PVA obtained were determined as described for PVA-1. The results are shown in Table 6.

[Synthesis and Evaluation of PVB]

PVB-1

In a 10 L glass vessel equipped with a reflux condenser, a thermometer and an anchor type impeller were charged 8,100 g of ion-exchanged water and 660 g of PVA-1 (PVA concentration: 7.5%), and the content was warmed to 95° C. to completely dissolve the PVA. Then, the content was

TABLE 6

| PVA Synthesis Example | PVAc | Saponification Concentration (% by mass) | Saponification NaOH (molar ratio) | Washing[1] MeOH amount | Washing[1] No. | Polymerization degree | Saponification degree (mol %) | Na (% by mass) |
|---|---|---|---|---|---|---|---|---|
| PVA-9 | PVAc-2 | 25 | 0.007 | 2 | 3 | 2400 | 88.3 | 0.25 |
| Comparative PVA-12 | PVAc-7 | 25 | 0.007 | 2 | 3 | 2400 | 88.2 | 0.17 |
| Comparative PVA-13 | PVAc-8 | 25 | 0.007 | 2 | 3 | 2400 | 88.3 | 0.17 |

[1] The amount of MeOH used for washing of a swollen gel after neutralization (mass ratio of MeOH to the swollen gel) and washing number PVA-10, Comparative PVA-14, 15

Each PVA was synthesized as described for PVA-1, except that the reaction was conducted under the conditions shown in Table 7. A polymerization degree, a saponification degree and a content of sodium acetate (converted to the mass of sodium) of the PVA obtained were determined as described for PVA-1. The results are shown in Table 7.

gradually cooled to 10° C. over about 30 min with stirring at 120 rpm. Then, to the vessel were added 384 g of n-butylaldehyde and 540 mL of 20% hydrochloric acid, to carry out a butyralation reaction for 150 min. Then, the mixture was heated to 60° C. over 60 min, kept at 60° C. for 120 min, and then cooled to room temperature. The precipitated resin was washed with ion-exchanged water, followed

TABLE 7

| PVA Synthesis Example | PVAc | Saponification Concentration (% by mass) | Saponification NaOH (molar ratio) | Washing[1] MeOH amount | Washing[1] No. | Polymerization degree | Saponification degree (mol %) | Na (% by mass) |
|---|---|---|---|---|---|---|---|---|
| PVA-10 | PVAc-3 | 15 | 0.006 | 2 | 3 | 3600 | 87.8 | 0.11 |
| Comparative PVA-14 | PVAc-9 | 15 | 0.006 | 2 | 3 | 3600 | 87.9 | 0.11 |
| Comparative PVA-15 | PVAc-10 | 15 | 0.006 | 2 | 3 | 3600 | 88.0 | 0.22 |

[1] The amount of MeOH used for washing of a swollen gel after neutralization (mass ratio of MeOH to the swollen gel) and washing number by adding an excessive aqueous solution of sodium hydroxide for neutralization. Subsequently, the resin was again washed with ion-exchanged water and then dried to provide PVB-1.

[Composition of PVB]

A butyralation degree (acetalization degree), a content of a vinyl acetate monomer unit and a content of a vinyl alcohol monomer unit of PVB-1 were determined in accordance with JIS K6728. A butyralation degree (acetalization degree) was 68.2 mol %, a content of a vinyl acetate monomer unit was 0.9 mol %, and a content of a vinyl alcohol monomer unit was 30.9 mol %. The results are also shown in Table 8.

PVB-2,3, Comparative PVB-1, 2

PVBs were synthesized and evaluated as described for PVB-1, except that a starting PVA was changed as shown in Table 8. The results are shown in Table 8.

PVB-4

A PVB was synthesized and evaluated as described for PVB-1, except that the amount of n-butylaldehyde was changed to 365 g. The results are shown in Table 8. Here, in the PVB, a butyralation degree (acetalization degree) was 64.3 mol %, a content of a vinyl acetate monomer unit was 0.9 mol %, and a content of a vinyl alcohol monomer unit was 34.8 mol %.

PVB-5

A PVB was synthesized and evaluated as described for PVB-1, except that the amount of n-butylaldehyde was changed to 449 g. The results are shown in Table 8. Here, in the PVB, a butyralation degree (acetalization degree) was 79.8 mol %, a content of a vinyl acetate monomer unit was 0.9 mol %, and a content of a vinyl alcohol monomer unit was 19.3 mol %.

Comparative PVB-3

A PVB was synthesized and evaluated as described for PVB-1, except that the amount of n-butylaldehyde was changed to 271 g. The results are shown in Table 8. Here, in the PVB, a butyralation degree (acetalization degree) was 48.2 mol %, a content of a vinyl acetate monomer unit was 0.9 mol %, and a content of a vinyl alcohol monomer unit was 50.9 mol %.

Comparative PVB-4

In a 10 L glass vessel equipped with a reflux condenser, a thermometer and an anchor type impeller were charged 8,100 g of ion-exchanged water and 660 g of PVA-1 (PVA concentration: 7.5%), and the content was warmed to 95° C. to completely dissolve the PVA. Then, the content was gradually cooled to 10° C. over about 30 min with stirring at 120 rpm. Then, to the vessel were added 740 g of n-butylaldehyde and 810 mL of 20% hydrochloric acid, to carry out a butyralation reaction for 150 min. Then, the mixture was heated to 80° C. over 90 min, kept at 80° C. for 16 hours, and then cooled to room temperature. The precipitated resin was washed with ion-exchanged water, followed by adding an excessive aqueous solution of sodium hydroxide for neutralization. Subsequently, the resin was again washed with ion-exchanged water and then dried to provide PVB. PVB obtained was evaluated as described for PVB-1. The results are shown in Table 8. Here, in the PVB, a butyralation degree (acetalization degree) was 87.4 mol %, a content of a vinyl acetate monomer unit was 0.9 mol %, and a content of a vinyl alcohol monomer unit was 11.7 mol %.

Comparative PVB-5

In a 10 L glass vessel equipped with a reflux condenser, a thermometer and an anchor type impeller were charged 8,100 g of ion-exchanged water and 660 g of comparative PVA-3 (PVA concentration: 5.0%), and the content was warmed to 95° C. to completely dissolve the PVA. Then, the content was gradually cooled to 8° C. over about 30 min with stirring at 120 rpm. Then, to the vessel were added 384 g of n-butylaldehyde and 540 mL of 20% hydrochloric acid, to carry out a butyralation reaction for 150 min. Then, the mixture was heated to 60° C. over 60 min, kept at 60° C. for 120 min, and then cooled to room temperature. The precipitated resin was washed with ion-exchanged water, followed by adding an excessive aqueous solution of sodium hydroxide for neutralization. Subsequently, the resin was again washed with ion-exchanged water and then dried to provide PVB. PVB obtained was evaluated as described for PVB-1. The results are shown in Table 8. Here, in the PVB, a butyralation degree (acetalization degree) was 68.5 mol %, a content of a vinyl acetate monomer unit was 1.5 mol %, and a content of a vinyl alcohol monomer unit was 30.0 mol %.

TABLE 8

| Synthesis Example | PVA used | Polymerization degree | Acetalization degree (mol %) | Vinyl acetate unit (mol %) | Vinyl alcohol unit (mol %) |
| --- | --- | --- | --- | --- | --- |
| PVB-1 | PVA-1 | 1700 | 68.2 | 0.9 | 30.9 |
| PVB-2 | PVA-2 | 1700 | 68.4 | 0.9 | 30.7 |
| PVB-3 | PVA-3 | 1700 | 68.6 | 0.9 | 30.5 |
| PVB-4 | PVA-1 | 1700 | 64.3 | 0.9 | 34.8 |
| PVB-5 | PVA-1 | 1700 | 79.8 | 0.9 | 19.3 |
| Comparative PVB-1 | Comparative PVA-1 | 1700 | 68.2 | 0.8 | 31.0 |
| Comparative PVB-2 | Comparative PVA-2 | 1700 | 68.4 | 0.9 | 30.7 |
| Comparative PVB-3 | PVA-1 | 1700 | 48.2 | 0.9 | 50.9 |
| Comparative PVB-4 | PVA-1 | 1700 | 87.4 | 0.9 | 11.7 |
| Comparative PVB-5 | Comparative PVA-3 | 1200 | 68.5 | 1.5 | 30.0 |

PVB-6

In a 10 L glass vessel equipped with a reflux condenser, a thermometer and an anchor type impeller were charged 8,234 g of ion-exchanged water and 526 g of PVA-4 (PVA concentration: 6.0%), and the content was warmed to 95° C. to completely dissolve the PVA. Then, the content was gradually cooled to 15° C. over about 30 min with stirring at 120 rpm. Then, to the vessel were added 307 g of n-butylaldehyde and 540 mL of 20% hydrochloric acid, to carry out a butyralation reaction for 120 min. Then, the mixture was heated to 60° C. over 60 min, kept at 60° C. for 120 min, and then cooled to room temperature. The precipitated resin was washed with ion-exchanged water, followed by adding an excessive aqueous solution of sodium hydroxide for neutralization. Subsequently, the resin was again washed with ion-exchanged water and then dried to provide PVB. PVB obtained was evaluated as described for PVB-1. The results are shown in Table 9. Here, in the obtained PVB, a butyralation degree (acetalization degree) was 68.2 mol %, a content of a vinyl acetate monomer unit was 1.3 mol %, and a content of a vinyl alcohol monomer unit was 30.5 mol %.

Comparative PVB-6,7

PVBs were synthesized and evaluated as described for PVB-6, except that a starting PVA was changed as shown in Table 9. The results are shown in Table 9.

PVB-8

In a 10 L glass vessel equipped with a reflux condenser, a thermometer and an anchor type impeller were charged 8,100 g of ion-exchanged water and 660 g of PVA-6 (PVA concentration: 7.5%), and the content was warmed to 95° C. to completely dissolve the PVA. Then, the content was gradually cooled to 15° C. over about 30 min with stirring at 120 rpm. Then, to the vessel were added 432 g of n-butylaldehyde and 540 mL of 20% hydrochloric acid, to carry out a butyralation reaction for 90 min. Then, the mixture was heated to 45° C. over 30 min, kept at 45° C. for 180 min, and then cooled to room temperature. The precipitated resin was washed with ion-exchanged water, followed by adding an excessive aqueous solution of sodium hydroxide for neutralization. Subsequently, the resin was again washed with ion-exchanged water and then dried to provide

TABLE 9

| Synthesis Example | PVA used | Polymerization degree | Acetalization degree (mol %) | Vinyl acetate unit (mol %) | Vinyl alcohol unit (mol %) |
|---|---|---|---|---|---|
| PVB-6 | PVA-4 | 2400 | 68.2 | 1.3 | 30.5 |
| Comparative PVB-6 | Comparative PVA-4 | 2400 | 68.2 | 1.7 | 30.1 |
| Comparative PVB-7 | Comparative PVA-5 | 2400 | 68.3 | 1.7 | 30.0 |

PVB-7

In a 10 L glass vessel equipped with a reflux condenser, a thermometer and an anchor type impeller were charged 8,322 g of ion-exchanged water and 438 g of PVA-5 (PVA concentration: 5.0%), and the content was warmed to 95° C. to completely dissolve the PVA. Then, the content was gradually cooled to 20° C. over about 30 min with stirring at 120 rpm. Then, to the vessel were added 256 g of n-butylaldehyde and 540 mL of 20% hydrochloric acid, to carry out a butyralation reaction for 120 min. Then, the mixture was heated to 60° C. over 60 min, kept at 60° C. for 120 min, and then cooled to room temperature. The precipitated resin was washed with ion-exchanged water, followed by adding an excessive aqueous solution of sodium hydroxide for neutralization. Subsequently, the resin was again washed with ion-exchanged water and dried to provide a PVB. PVB obtained was evaluated as described for PVB-1. The results are shown in Table 10. Here, in the obtained PVB, a butyralation degree (acetalization degree) was 68.1 mol %, a content of a vinyl acetate monomer unit was 1.5 mol %, and a content of a vinyl alcohol monomer unit was 30.4 mol %.

Comparative PVB-8 to 10

PVBs were synthesized and evaluated as described for PVB-7, except that a starting PVA was changed as shown in Table 10. The results are shown in Table 10.

polyvinyl butyral. PVB obtained was evaluated as described for PVB-1. The results are shown in Table 11. Here, in the obtained PVB, a butyralation degree (acetalization degree) was 74.1 mol %, a content of a vinyl acetate monomer unit was 8.1 mol %, and a content of a vinyl alcohol monomer unit was 17.8 mol %.

PVB-9, 10

PVBs were synthesized and evaluated as described for PVB-8, except that a starting PVA was changed as shown in Table 11. The results are shown in Table 11.

PVB-11

A PVB was synthesized and evaluated as described for PVB-8, except that the amount of n-butylaldehyde was changed to 307 g. The results are shown in Table 11. Here, in the obtained PVB, a butyralation degree (acetalization degree) was 63.2 mol %, a content of a vinyl acetate monomer unit was 8.5 mol %, and a content of a vinyl alcohol monomer unit was 28.3 mol %.

PVB-12

A PVB was synthesized and evaluated as described for PVB-8, except that the amount of n-butylaldehyde was changed to 458 g. The results are shown in Table 11. Here, in the obtained PVB, a butyralation degree (acetalization degree) was 78.5 mol %, a content of a vinyl acetate monomer unit was 7.5 mol %, and a content of a vinyl alcohol monomer unit was 14.0 mol %.

TABLE 10

| Synthesis Example | PVA used | Polymerization degree | Acetalization degree (mol %) | Vinyl acetate unit (mol %) | Vinyl alcohol unit (mol %) |
|---|---|---|---|---|---|
| PVB-7 | PVA-5 | 3600 | 68.1 | 1.5 | 30.4 |
| Comparative PVB-8 | Comparative PVA-6 | 3600 | 68.3 | 1.7 | 30.0 |
| Comparative PVB-9 | Comparative PVA-7 | 3600 | 68.4 | 1.7 | 29.9 |
| Comparative PVB-10 | Comparative PVA-8 | 5500 | 68.8 | 0.8 | 30.4 |

Comparative PVB-11,12

PVBs were synthesized and evaluated as described for PVB-8, except that a starting PVA was changed as shown in Table 11. The results are shown in Table 11.

Comparative PVB-13

In a 10 L glass vessel equipped with a reflux condenser, a thermometer and an anchor type impeller were charged 8,100 g of ion-exchanged water and 660 g of Comparative PVB-11 (PVA concentration: 7.5%), and the content was warmed to 95° C. to completely dissolve the PVA. Then, the content was gradually cooled to 10° C. over about 60 min with stirring at 120 rpm. Then, to the vessel were added 450 g of n-butylaldehyde and 540 mL of 20% hydrochloric acid, to carry out a butyralation reaction for 90 min. Then, the mixture was heated to 30° C. over 30 min, kept at 30° C. for 120 min, and then cooled to room temperature. The precipitated resin was washed with ion-exchanged water, followed by adding an excessive aqueous solution of sodium hydroxide for neutralization. Subsequently, the resin was again washed with ion-exchanged water and then dried to provide PVB. PVB obtained was evaluated as described for PVB-1. The results are shown in Table 11. Here, in the obtained PVB, a butyralation degree (acetalization degree) was 74.3 mol %, a content of a vinyl acetate monomer unit was 7.9 mol %, and a content of a vinyl alcohol monomer unit was 17.8 mol %.

TABLE 11

| Synthesis Example | PVA used | Polymerization degree | Acetalization degree (mol %) | Vinyl acetate unit (mol %) | Vinyl alcohol unit (mol %) |
|---|---|---|---|---|---|
| PVB-8 | PVA-6 | 1700 | 74.1 | 8.1 | 17.8 |
| PVB-9 | PVA-7 | 1700 | 74.2 | 7.9 | 17.9 |
| PVB-10 | PVA-8 | 1700 | 74.2 | 8.0 | 17.8 |
| PVB-11 | PVA-6 | 1700 | 63.2 | 8.5 | 28.3 |
| PVB-12 | PVA-6 | 1700 | 78.5 | 7.5 | 14.0 |
| Comparative PVB-11 | Comparative PVA-9 | 1700 | 74.1 | 8.2 | 17.7 |
| Comparative PVB-12 | Comparative PVA-10 | 1700 | 74.3 | 8.0 | 17.7 |
| Comparative PVB-13 | Comparative PVA-11 | 1200 | 74.3 | 7.9 | 17.8 |

PVB-13

In a 10 L glass vessel equipped with a reflux condenser, a thermometer and an anchor type impeller were charged 8,234 g of ion-exchanged water and 526 g of PVB-9 (PVA concentration: 6.0%), and the content was warmed to 95° C. to completely dissolve the PVA. Then, the content was gradually cooled to 15° C. over about 60 min with stirring at 120 rpm. Then, to the vessel were added 344 g of n-butylaldehyde and 540 mL of 20% hydrochloric acid, to carry out a butyralation reaction for 90 min. Then, the mixture was heated to 45° C. over 30 min, kept at 45° C. for 180 min, and then cooled to room temperature. The precipitated resin was washed with ion-exchanged water, followed by adding an excessive aqueous solution of sodium hydroxide for neutralization. Subsequently, the resin was again washed with ion-exchanged water and then dried to provide PVB. PVB obtained was evaluated as described for PVB-1. The results are shown in Table 12. Here, in the obtained PVB, a butyralation degree (acetalization degree) was 74.6 mol %, a content of a vinyl acetate monomer unit was 8.3 mol %, and a content of a vinyl alcohol monomer unit was 17.1 mol %.

Comparative PVB-14,15

PVBs were synthesized and evaluated as described for PVB-13, except that a starting PVA was changed as shown in Table 12. The results are shown in Table 12.

TABLE 12

| Synthesis Example | PVA used | Polymerization degree | Acetalization degree (mol %) | Vinyl acetate unit (mol %) | Vinyl alcohol unit (mol %) |
|---|---|---|---|---|---|
| PVB-13 | PVA-9 | 2400 | 74.6 | 8.3 | 17.1 |
| Comparative PVB-14 | Comparative PVA-12 | 2400 | 74.6 | 8.2 | 17.2 |
| Comparative PVB-15 | Comparative PVA-13 | 2400 | 74.5 | 8.1 | 17.4 |

PVB-14

In a 10 L glass vessel equipped with a reflux condenser, a thermometer and an anchor type impeller were charged 8,234 g of ion-exchanged water and 438 g of PVB-10 (PVA concentration: 5.0%), and the content was warmed to 95° C. to completely dissolve the PVA. Then, the content was gradually cooled to 15° C. over about 60 min with stirring at 120 rpm. Then, to the vessel were added 265 g of n-butylaldehyde and 540 mL of 20% hydrochloric acid, to carry out a butyralation reaction for 90 min. Then, the mixture was heated to 45° C. over 30 min, kept at 45° C. for 180 min, and then cooled to room temperature. The precipitated resin was washed with ion-exchanged water, followed by adding an excessive aqueous solution of sodium hydroxide for neutralization. Subsequently, the resin was again washed with ion-exchanged water and then dried to provide PVB. PVB obtained was evaluated as described for PVB-1. The results are shown in Table 13. Here, in the obtained PVB, a butyralation degree (acetalization degree) was 73.2 mol %, a content of a vinyl acetate monomer unit was 8.1 mol %, and a content of a vinyl alcohol monomer unit was 18.7 mol %.

Comparative PVB-16,17

PVBs were synthesized and evaluated as described for PVB-14, except that a starting PVA was changed as shown in Table 13. The results are shown in Table 13.

A peak-top molecular weight (A) measured by a differential refractive index detector was 95000, and a signal strength (a) at the peak-top molecular weight (A) was 108.8 mV. A peak-top molecular weight (B) measured by an absorptiometer (280 nm) was 44900, and a signal strength (absorbance, b) at the peak-top molecular weight (B) was 1.63 mV ($1.63\times10^{-3}$ absorbance unit). The peak-top molecular weight (A) and the peak-top molecular weight (B) obtained were substituted into the following formula:

$$(A-B)/A,$$

to give a value of 0.53. The results are shown in Table 14. Here, a molecular weight was determined by converting an elution volume by the use of a calibration curve (PMMA-converted molecular weight).

A peak-top molecular weight (C) measured by an absorptiometer (320 nm) which was determined as described for determining the peak-top molecular weight (B) except a different measurement wavelength was used, was 45600, and a signal strength (absorbance, c) at the peak-top molecular weight (C) was 1.03 mV ($1.03\times10^{-3}$ absorbance unit). The peak-top molecular weight (A) and the peak-top molecular weight (C) were substituted into the following formula:

$$(A-C)/A,$$

to give a value of 0.52. The results are shown in Table 14.

TABLE 13

| Synthesis Example | PVA used | Polymerization degree | Acetalization degree (mol %) | Vinyl acetate unit (mol %) | Vinyl alcohol unit (mol %) |
|---|---|---|---|---|---|
| PVB-14 | PVA-10 | 3600 | 73.2 | 8.1 | 18.7 |
| Comparative PVB-16 | Comparative PVA-14 | 3600 | 73.8 | 7.9 | 18.3 |
| Comparative PVB-17 | Comparative PVA-15 | 3600 | 73.6 | 8.2 | 18.2 |

Example 1

(Production of an Interlayer Film for a Laminated Glass)

First, 0.007 parts by mass of titanium oxide fine particles "JR-1000" (refractive index: 2.72) from TAYCA Corporation as light-diffusing fine particles, 0.014 parts by mass of magnesium acetate and 19 parts by weight of triethylene glycol di(2-ethylhexanoate) as a plasticizer were mixed, and the mixture was stirred using a stirrer for 30 min, to prepare a mixed liquid. The mixed liquid was added to 50 parts by mass of powdered PVB-1, and the mixture was melt-kneaded at 160° C. and 50 rpm for 5 min using Labo Plastomill "Model C" from Toyo Seiki Seisaku-Sho, Ltd. Throughout the melt kneading, nitrogen (100 mL/min) was blown into the vessel. The kneaded matter thus obtained was hot-pressed at 160° C. and 5 MPa for 30 min, to produce a 20 cm×20 cm interlayer film for a laminated glass with a thickness of 760 μm. Here, the interlayer film for a laminated glass contains 0.0101% by mass of light-diffusing fine particles. The interlayer film for a laminated glass obtained was analyzed by GPC and evaluated for foreign materials (undissolved materials) as described below.

(GPC Analysis)

The interlayer film for a laminated glass obtained was heated by hot-pressing at a pressure of 2 MPa and a temperature of 230° C. for 3 hours and then cooled, to afford a heated interlayer film for a laminated glass. From its central part, a sample was taken and analyzed by GPC as described above.

A monodisperse PMMA was "PMMA85K" (weight-average molecular weight: 85450, number average molecular weight: 74300, intrinsic viscosity: 0.309) from American Polymer Standard Corp. GPC measurement of the monodisperse PMMA was conducted as described for the above method. A signal strength (x) at a peak-top molecular weight measured by a differential refractive index detector as determined by the method described for determining a peak-top molecular weight (A) was 390.82 mV. Furthermore, a signal strength (absorbance, y) at a peak-top molecular weight measured by an absorptiometer (220 nm) as determined by the method for determining a peak-top molecular weight (B) was 269.28 mV (0.26928 absorbance unit).

A signal strength (a), a peak-top molecular weight (b), a signal strength (x) and a signal strength (y) were substituted into the following formula:

$$(b/y)/(a/x),$$

to give a value of $2.17\times10^{-2}$. The results are shown in Table 14.

A signal strength (a), a peak-top molecular weight (c), a signal strength (x) and a signal strength (y) were substituted into the following formula:

$$(c/y)/(a/x),$$

to give a value of $1.37\times10^{-2}$. The results are shown in Table 14.

(Measurement of an Average Particle Size of Light-Diffusing Fine Particles)

Using a laser diffraction/scattering particle size distribution analyzer "Partica LA-950" from HORIBA, Ltd., a volume-based average size of the light-diffusing fine particles in the mixed liquid prepared as described for a method for preparing a mixed liquid in the section "Production of an interlayer film for a laminated glass" was measured as an average particle size of the fine particles. The evaluation results are shown in Table 14.

[Undissolved Materials in an Interlayer Film for a Laminated Glass]

The interlayer film for a laminated glass obtained was sandwiched between two glass sheets (20 cm in length×20 cm in width, 3 mm in thickness), and passed through a press roll at 110° C. for preliminary bonding while the air between the glass sheets and the interlayer film for a laminated glass was expelled. The laminate after preliminary bonding was left in an autoclave at 135° C. and 1.2 MPa for 30 min, to produce a laminated glass (total: 20 sheets). Foreign materials in the laminated glass obtained were counted using a magnifier. The total number of the foreign materials in twenty sheets of the laminated glasses was counted, and an evaluation was made according to the following criteria. The results are shown in Table 14.

A: 0 (per 20 sheets)
B: 1 to 2 (per 20 sheets)
C: 2 to 5 (per 20 sheets)
D: 5 to 11 (per 20 sheets)
E: 12 or more (per 20 sheets)

(Discoloration Resistance of an Interlayer Film for a Laminated Glass)

A kneaded matter as used for preparing the above interlayer film for a laminated glass containing PVB-1 was prepared. To 34.5 parts by mass of the kneaded matter were added further 25 parts by mass of powdery PVB-1, and a mixed liquid prepared by mixing 0.0035 parts by mass of titanium oxide fine particles "JR-1000", 9.5 parts by mass of triethylene glycol di(2-ethylhexanoate) and 0.007 parts by mass of magnesium acetate and stirring by an agitator for 30 min, and the resulting mixture was again melt-kneaded at 140° C. and 50 rpm for 5 min using Labo Plastomill "Model C" from Toyo Seiki Seisaku-Sho, Ltd. Throughout the melt kneading, nitrogen (100 mL/min) was blown into the vessel. To 40 parts by mass of the kneaded matter obtained were added further comparative powdery PVB-1, "Kuraray Polyol P-510" and magnesium acetate in the equal amounts to those described above and the mixture was kneaded under the conditions as described above, and this procedure was conducted three times in total. Using the kneaded matter obtained (repetitively kneaded matter-1), an interlayer film for a laminated glass was produced by the above process for producing an interlayer film for a laminated glass containing PVB-1. Then, using the interlayer film, a laminated glass was produced by the process for producing a laminated glass described in the section "Foreign materials in an interlayer film for a laminated glass". For each of the laminated glass obtained (produced using the repetitively heated PVB) and the laminated glass (produced using a virgin PVB) obtained in the section "Foreign materials in an interlayer film for a laminated glass", a yellow index was measured and from a difference ($\Delta YI$) in a yellow index between these, discoloration resistance was evaluated according to the following criteria. Measurement was conducted using SM color computer "SM-T-H" from Suga Test Instruments Co., Ltd. in accordance with JIS K 7105. The evaluation results are shown in Table 14.

A: less than 0.5
B: 0.5 or more and less than 1.0
C: 1.0 or more and less than 1.8
D: 1.8 or more and less than 3.0
E: 3.0 or more (Penetration Resistance of a Laminated Glass)

An interlayer film for a laminated glass was produced as described for the interlayer film for a laminated glass produced using the repetitively kneaded matter-1 described in the section "Discoloration resistance of an interlayer film for a laminated glass". The interlayer film for a laminated glass was humidity-conditioned under the conditions of 23° C. and 28% RH for 24 hours. Then, it was sandwiched between two transparent glass sheets (30 cm×30 cm), which was passed through a press roll at 110° C. for preliminary bonding while the air between the glass sheets and the interlayer film for a laminated glass was expelled. The laminate after preliminary bonding was left in an autoclave at 135° C. and 1.2 MPa for 30 min, to produce a laminated glass (total: 6 sheets). The laminated glass obtained was evaluated by a method described in a penetration resistance test in accordance with JIS R 3212 (Test method of safety glazing materials for road vehicles) and JIS R 3211 (Safety glazing materials for road vehicles). Specifically, the laminated glass was temperature-controlled at 23° C. for 4 hours and then horizontally put on a dedicated support frame. Then, a 2260 g steel ball with a diameter of 82 mm was allowed to free-fall from a height of 4 m on the center of laminated glass. When the steel ball penetrated through the glass within 5 sec after the collision, the glass was judged as "penetrated". After testing all of six laminated glasses, the glass was passed when no glasses were judged as "penetrated", while being rejected when 4 or less glasses were judged as "not penetrated". If 5 glasses were judged as "not penetrated", a retest was conducted and when all of 6 glasses were judged as "not penetrated", the glass was passed, and otherwise, the glass was rejected. The results are shown in Table 14.

(Calculation of a Difference Absolute Value of a Refractive Index between an Interlayer Film for a Laminated Glass and Light-Diffusing Fine Particles)

In Labo Plastomill "Model C" from Toyo Seiki Seisaku-Sho, Ltd., 50 parts by mass of powdery PVB-1, 19 parts by weight of triethylene glycol di(2-ethylhexanoate) as a plasticizer and 0.014 parts by mass of magnesium acetate were melt-kneaded at 160° C. and 50 rpm for 5 min. Throughout the melt-kneading, nitrogen (100 mL/min) was blown into the vessel. The kneaded matter thus obtained was processed as described in the above section (Production of an interlayer film for a laminated glass) to give a base material containing PVB-1 for an interlayer film for a laminated glass. A refractive index of the base materials for an interlayer film for a laminated glass was measured by an Abbe refractomer from ATAGO Co., Ltd., and a difference absolute value between the refractive index thus measured and a refractive of light-diffusing fine particles was calculated. The evaluation results are shown in Table 14.

(Measurement of a Haze)

An interlayer film for a laminated glass was produced as described for the interlayer film for a laminated glass produced using the repetitively kneaded matter-1 described in the section "Discoloration resistance of an interlayer film fora laminated glass". Then, using the interlayer film, a laminated glass was produced by the process for producing a laminated glass described in the section "Foreign materials in an interlayer film for a laminated glass". A haze of the laminated glass was measured by a haze meter (HZ-1) from Suga Test Instruments Co., Ltd. in accordance with JIS K 7105. The evaluation results are shown in Table 14.

Separately, using an interlayer film for a laminated glass produced in the section "Production of an interlayer film for a laminated glass", a laminated glass was produced by a process for producing a laminated glass described in the section "Foreign materials in an interlayer film for a laminated glass". A haze was measured as described above. A difference between the measured haze and the haze of the laminated glass using the interlayer film for a laminated glass produced from the repetitively kneaded matter-1 was determined. When an increase in a haze was less than 0.3, the glass was passed, while when an increase was 0.3 or more, the glass was rejected. The evaluation results are shown in Table 14.

(Evaluation of Brightness of a Laminated Glass)

An interlayer film for a laminated glass was produced as described for the interlayer film for a laminated glass produced using the repetitively kneaded matter-1 described in the section "Discoloration resistance of an interlayer film for a laminated glass", and then, a laminated glass was produced by the process for producing a laminated glass described in the section "Foreign materials in an interlayer film for a laminated glass". On two opposite sides of the laminated glass were arranged point light sources described below, to give a surface light emitter, for which brightness was visually evaluated according to five-point scale. The brightest emitter was evaluated as "A", while the least bright emitter was evaluated as "E". The evaluation results are shown in Table 14.

Light source used: white LED "NS2W157ART-H3" from Nichia Corporation;
Light source number: 20 per side
Arrangement interval: 10 mm
Applied voltage: 2.8 V/one light source Examples 2 to 9, and Comparative Examples 1 to 7

An interlayer film for a laminated glass was produced and evaluated as described in Example 1, except that PVB-1 was replaced with a PVB shown in Table 14 and the amount of titanium oxide fine particles "JR-1000" was changed to that shown in Table 14. The results are shown in Table 14.

TABLE 14

|  | PVB | Polymerization degree | Acetalization degree (mol %) | Light-diffusing fine particles % by mass | Average particle size (µm) | (A − B)/A | (A − C)/A | (b/y)/(a/x) | (c/y)/(a/x) |
|---|---|---|---|---|---|---|---|---|---|
| Example 1 | PVB-1 | 1700 | 68.2 | 0.0101 | 1.18 | 0.53 | 0.52 | $2.17 * 10^{-2}$ | $1.37 * 10^{-2}$ |
| Example 2 | PVB-2 | 1700 | 68.4 | 0.0101 | 1.18 | 0.32 | 0.35 | $1.75 * 10^{-1}$ | $5.60 * 10^{-2}$ |
| Example 3 | PVB-3 | 1700 | 68.6 | 0.0101 | 1.18 | 0.26 | 0.37 | $1.07 * 10^{-2}$ | $5.19 * 10^{-3}$ |
| Example 4 | PVB-4 | 1700 | 64.3 | 0.0101 | 1.18 | 0.57 | 0.54 | $2.87 * 10^{-2}$ | $1.49 * 10^{-2}$ |
| Example 5 | PVB-5 | 1700 | 79.8 | 0.0101 | 1.18 | 0.51 | 0.48 | $1.79 * 10^{-2}$ | $1.28 * 10^{-2}$ |
| Example 6 | PVB-1 | 1700 | 68.2 | 0.0202 | 1.20 | 0.55 | 0.53 | $2.18 * 10^{-2}$ | $1.38 * 10^{-2}$ |
| Example 7 | PVB-1 | 1700 | 68.2 | 0.0026 | 1.17 | 0.53 | 0.51 | $2.16 * 10^{-2}$ | $1.35 * 10^{-2}$ |
| Example 8 | PVB-1 | 1700 | 68.2 | 0.0051 | 1.19 | 0.52 | 0.50 | $2.17 * 10^{-2}$ | $1.32 * 10^{-2}$ |
| Example 9 | PVB-1 | 1700 | 68.2 | 0.0304 | 1.20 | 0.53 | 0.52 | $2.16 * 10^{-2}$ | $1.34 * 10^{-2}$ |
| Comparative Example 1 | Comparative PVB-1 | 1700 | 68.2 | 0.0101 | 1.18 | 0.62 | 0.61 | $3.64 * 10^{-3}$ | $2.23 * 10^{-3}$ |
| Comparative Example 2 | Comparative PVB-2 | 1700 | 68.4 | 0.0101 | 1.18 | 0.24 | 0.22 | $2.80 * 10^{-1}$ | $1.22 * 10^{-1}$ |
| Comparative Example 3 | Comparative PVB-3 | 1700 | 48.2 | 0.0101 | 1.18 | 0.64 | 0.58 | $4.15 * 10^{-2}$ | $1.88 * 10^{-2}$ |
| Comparative Example 4 | Comparative PVB-4 | 1700 | 87.4 | 0.0101 | 1.18 | 0.48 | 0.51 | $1.72 * 10^{-2}$ | $1.27 * 10^{-2}$ |
| Comparative Example 5 | Comparative PVB-5 | 1200 | 68.5 | 0.0101 | 1.18 | 0.28 | 0.51 | $3.37 * 10^{-2}$ | $1.91 * 10^{-2}$ |
| Comparative Example 6 | PVB-1 | 1700 | 68.2 | 0 | — | 0.50 | 0.48 | $2.15 * 10^{-2}$ | $1.35 * 10^{-2}$ |
| Comparative Example 7 | PVB-1 | 1700 | 68.2 | 0.0507 | 1.18 | 0.56 | 0.52 | $2.18 * 10^{-2}$ | $1.37 * 10^{-2}$ |

|  | Evaluation of an interlayer film | | | | Evaluation of a laminated glass | | | |
|---|---|---|---|---|---|---|---|---|
|  | Undissolved materials | Discoloration resistance | Penetration resistance | Difference absolute value of refractive index | Haze (%) | Increase in a haze | Brightness 50 mm from the light source | Brightness 100 mm from the light source |
| Example 1 | A | A | Passed | 1.24 | 7.4 | Passed | A | B |
| Example 2 | A | A | Passed | 1.24 | 7.2 | Passed | A | B |
| Example 3 | A | A | Passed | 1.24 | 7.4 | Passed | A | B |
| Example 4 | A | A | Passed | 1.24 | 7.5 | Passed | A | B |
| Example 5 | A | A | Passed | 1.24 | 7.6 | Passed | A | B |
| Example 6 | A | A | Passed | 1.24 | 17.4 | Passed | A | C |
| Example 7 | A | A | Passed | 1.24 | 3.2 | Passed | C | C |
| Example 8 | A | A | Passed | 1.24 | 4.7 | Passed | B | B |
| Example 9 | A | A | Passed | 1.24 | 18.5 | Passed | A | C |
| Comparative Example 1 | D | A | Passed | 1.24 | 8.0 | Rejected | A | B |

TABLE 14-continued

| | | | | | | | | |
|---|---|---|---|---|---|---|---|---|
| Comparative Example 2 | A | E | Rejected | 1.24 | 7.0 | Passed | A | B |
| Comparative Example 3 | C | B | Rejected | 1.25 | 7.5 | Rejected | A | B |
| Comparative Example 4 | B | C | Rejected | 1.24 | 7.3 | Rejected | A | B |
| Comparative Example 5 | A | A | Rejected | 1.24 | 6.9 | Passed | A | B |
| Comparative Example 6 | A | A | Passed | — | 1.3 | Passed | E | E |
| Comparative Example 7 | A | A | Passed | 1.24 | 28.7 | Passed | A | E |

* Titanium oxide fine particles were used as light-diffusing fine particles.

In Table 14, for the interlayer films for a laminated glass of Examples 1 to 9, the interlayer film for a laminated glass contains a small amount of foreign materials (undissolved materials) and exhibits excellent discoloration resistance. Furthermore, a laminated glass produced using the interlayer film for a laminated glass exhibits excellent penetration resistance, transparency and light-diffusing properties, and even when an interlayer film for a laminated glass made of a repetitively-heated kneaded matter is used, increase in a haze is inhibited. Meanwhile, the interlayer films for a laminated glass of Comparative Examples 1 to 7 which do not satisfy the conditions defined in the present invention is unsatisfactory for some performance.

Examples 10 to 12 and Comparative Example 8

An interlayer film for a laminated glass was produced and evaluated as described for Example 1, except that titanium oxide fine particles "JR-1000" from TAYCA Corporation were replaced with titanium oxide fine particles "JR-301" (refractive index 2.72) from TAYCA Corporation and the amount of "JR-301" was changed to that shown in Table 15. The results are shown in Table 15.

In Table 15, for the interlayer films for a laminated glass of Examples 10 to 12, the interlayer film for a laminated glass contains a small amount of foreign materials (undissolved materials) and exhibits excellent discoloration resistance. Furthermore, a laminated glass produced using the interlayer film for a laminated glass exhibits excellent penetration resistance, transparency and light-diffusing properties, and even when an interlayer film for a laminated glass made of a repetitively-heated kneaded matter is used, increase in a haze is inhibited. Meanwhile, the interlayer films for a laminated glass of Comparative Example 8 which does not satisfy the conditions defined in the present invention is unsatisfactory for some performance.

Examples 13 to 15, and Comparative Example 9

An interlayer film for a laminated glass was produced and evaluated as described for Example 1, except that titanium oxide fine particles "JR-1000" from TAYCA Corporation were replaced with zinc oxide fine particles "zinc oxide No. 1" (refractive index: 1.95) from SAKAI Chemical Industry Co., Ltd. and the amount of "zinc oxide No. 1" was changed to that shown in Table 16. The results are shown in Table 16.

TABLE 15

| | PVB | Polymerization degree | Acetalization degree (mol %) | Light-diffusing fine particles % by mass | Light-diffusing fine particles Average particle size (μm) | (A − B)/A | (A − C)/A | (b/y)/(a/x) | (c/y)/(a/x) |
|---|---|---|---|---|---|---|---|---|---|
| Example 10 | PVB-1 | 1700 | 68.2 | 0.0051 | 0.33 | 0.53 | 0.50 | $2.20 * 10^{-2}$ | $1.36 * 10^{-2}$ |
| Example 11 | PVB-1 | 1700 | 68.2 | 0.0013 | 0.31 | 0.53 | 0.51 | $2.18 * 10^{-2}$ | $1.37 * 10^{-2}$ |
| Example 12 | PVB-1 | 1700 | 68.2 | 0.0077 | 0.34 | 0.54 | 0.52 | $2.17 * 10^{-2}$ | $1.37 * 10^{-2}$ |
| Comparative Example 8 | PVB-1 | 1700 | 68.2 | 0.0101 | 0.34 | 0.56 | 0.53 | $2.18 * 10^{-2}$ | $1.38 * 10^{-2}$ |

| | Evaluation of an interlayer film | | | Evaluation of a laminated glass | | | |
|---|---|---|---|---|---|---|---|
| | Undissolved materials | Discoloration resistance | Penetration resistance | Difference absolute value of refractive index | Haze (%) | Increase in a haze | Brightness 50 mm from the light source | Brightness 100 mm from the light source |
| Example 10 | A | A | Passed | 1.24 | 12.5 | Passed | A | B |
| Example 11 | A | A | Passed | 1.24 | 4.1 | Passed | B | C |
| Example 12 | A | A | Passed | 1.24 | 18.7 | Passed | A | C |
| Comparative Example 8 | A | A | Passed | 1.24 | 22.2 | Passed | A | D |

* Titanium oxide fine particles were used as light-diffusing fine particles.

Comparative Example 10

An interlayer film for a laminated glass was produced and evaluated as described for Example 1, substituting calcium carbonate fine particles "Hydrocarb 95T-OG" (refractive index: 1.59) from Omya GmbH for titanium oxide fine particles "JR-1000" from TAYCA Corporation. The results are shown in Table 16.

TABLE 16

| | PVB | Polymerization degree | Acetalization degree (mol %) | Light-diffusing fine particles % by mass | Average particle size (μm) | (A − B)/A | (A − C)/A | (b/y)/(a/x) | (c/y)/(a/x) |
|---|---|---|---|---|---|---|---|---|---|
| Example 13 | PVB-1 | 1700 | 68.2 | 0.0202 | 0.54 | 0.53 | 0.51 | $2.18 * 10^{-2}$ | $1.37 * 10^{-2}$ |
| Example 14 | PVB-1 | 1700 | 68.2 | 0.0101 | 0.54 | 0.53 | 0.51 | $2.18 * 10^{-2}$ | $1.37 * 10^{-2}$ |
| Example 15 | PVB-1 | 1700 | 68.2 | 0.0304 | 0.55 | 0.55 | 0.53 | $2.21 * 10^{-2}$ | $1.39 * 10^{-2}$ |
| Comparative Example 9 | PVB-1 | 1700 | 68.2 | 0.0507 | 0.57 | 0.56 | 0.52 | $2.20 * 10^{-2}$ | $1.41 * 10^{-2}$ |
| Comparative Example 10 | PVB-1 | 1700 | 68.2 | 0.0101 | 0.83 | 0.53 | 0.52 | $2.15 * 10^{-2}$ | $1.35 * 10^{-2}$ |

| | Evaluation of an interlayer film | | | Evaluation of a laminated glass | | | Brightness | |
|---|---|---|---|---|---|---|---|---|
| | Undissolved materials | Discoloration resistance | Penetration resistance | Difference absolute value of refractive index | Haze (%) | Increase in a haze | 50 mm from the light source | 100 mm from the light source |
| Example 13 | A | A | Passed | 0.47 | 11.7 | Passed | A | B |
| Example 14 | A | A | Passed | 0.47 | 6.3 | Passed | C | C |
| Example 15 | A | A | Passed | 0.47 | 15.5 | Passed | A | C |
| Comparative Example 9 | A | A | Passed | 0.47 | 24.0 | Passed | A | E |
| Comparative Example 10 | A | A | Passed | 0.11 | 2.8 | Passed | E | E |

* Examples 13 to 15, Comparative Example 9: Zinc oxide fine particles were used as light-diffusing fine particles. Comparative Example 10: Calcium carbonate fine particles were used as light-diffusing fine particles.

In Table 16, for the interlayer films for a laminated glass of Examples 13 to 15, the interlayer film for a laminated glass contains a small amount of foreign materials (undissolved materials) and exhibits excellent discoloration resistance. Furthermore, a laminated glass produced using the interlayer film for a laminated glass exhibits excellent penetration resistance, transparency and light-diffusing properties, and even when an interlayer film for a laminated glass made of a repetitively-heated kneaded matter is used, increase in a haze is inhibited. Meanwhile, the interlayer films for a laminated glass of Comparative Examples 9 to 10 which do not satisfy the conditions defined in the present invention is unsatisfactory for some performance.

Example 16, and Comparative Examples 11 to 12

An interlayer film for a laminated glass was produced and evaluated as described for Example 1, substituting PVB shown in Table 17 for PVB-1. The results are shown in Table 17.

TABLE 17

| | PVB | Polymerization degree | Acetalization degree (mol %) | Light-diffusing fine particles | | (A − B)/A | (A − C)/A | (b/y)/(a/x) | (c/y)/(a/x) |
| | | | | % by mass | Average particle size (µm) | | | | |
|---|---|---|---|---|---|---|---|---|---|
| Example 16 | PVB-6 | 2400 | 68.2 | 0.0101 | 1.18 | 0.75 | 0.66 | $2.11 * 10^{-2}$ | $1.31 * 10^{-2}$ |
| Comparative Example 11 | Comparative PVB-6 | 2400 | 68.2 | 0.0101 | 1.18 | 0.87 | 0.88 | $3.30 * 10^{-3}$ | $2.15 * 10^{-3}$ |
| Comparative Example 12 | Comparative PVB-7 | 2400 | 68.3 | 0.0101 | 1.18 | 0.33 | 0.35 | $2.35 * 10^{-1}$ | $9.19 * 10^{-2}$ |

| | Evaluation of an interlayer film | | | Evaluation of a laminated glass | | | Brightness | |
| | | | | Difference | | | | |
| | Undissolved materials | Discoloration resistance | Penetration resistance | absolute value of refractive index | Haze (%) | Increase in a haze | 50 mm from the light source | 100 mm from the light source |
|---|---|---|---|---|---|---|---|---|
| Example 16 | A | A | Passed | 1.24 | 8.1 | Passed | A | B |
| Comparative Example 11 | D | A | Passed | 1.24 | 8.5 | Rejected | A | B |
| Comparative Example 12 | A | E | Rejected | 1.24 | 7.8 | Passed | A | B |

*Titanium oxide fine particles were used as light-diffusing fine particles.

In Table 17, for the interlayer film for a laminated glass of Example 16, the interlayer film for a laminated glass contains a small amount of foreign materials (undissolved materials) and exhibits excellent discoloration resistance. Furthermore, a laminated glass produced using the interlayer film for a laminated glass exhibits excellent penetration resistance, transparency and light-diffusing properties, and even when an interlayer film for a laminated glass made of a repetitively-heated kneaded matter is used, increase in a haze is inhibited. Meanwhile, the interlayer films for a laminated glass of Comparative Examples 11 to 12 which do not satisfy the conditions defined in the present invention is unsatisfactory for some performance.

Example 17 and Comparative Examples 13 to 15

An interlayer film for a laminated glass was produced and evaluated as described for Example 1, substituting PVB shown in Table 18 for PVB-1. The results are shown in Table 18.

TABLE 18

| | PVB | Polymerization degree | Acetalization degree (mol %) | Light-diffusing fine particles | | (A − B)/A | (A − C)/A | (b/y)/(a/x) | (c/y)/(a/x) |
| | | | | % by mass | Average particle size (µm) | | | | |
|---|---|---|---|---|---|---|---|---|---|
| Example 17 | PVB-7 | 3600 | 68.1 | 0.0101 | 1.18 | 0.76 | 0.78 | $1.73 * 10^{-2}$ | $1.15 * 10^{-2}$ |
| Comparative Example 13 | Comparative PVB-8 | 3600 | 68.3 | 0.0101 | 1.18 | 0.90 | 0.90 | $3.11 * 10^{-3}$ | $2.00 * 10^{-3}$ |
| Comparative Example 14 | Comparative PVB-9 | 3600 | 68.4 | 0.0101 | 1.18 | 0.39 | 0.33 | $2.24 * 10^{-1}$ | $8.74 * 10^{-2}$ |
| Comparative Example 15 | Comparative PVB-10 | 5500 | 68.8 | 0.0101 | 1.18 | 0.35 | 0.47 | $1.15 * 10^{-2}$ | $7.37 * 10^{-3}$ |

| | Evaluation of an interlayer film | | | Evaluation of a laminated glass | | | Brightness | |
| | | | | Difference | | | | |
| | Undissolved materials | Discoloration resistance | Penetration resistance | absolute value of refractive index | Haze (%) | Increase in a haze | 50 mm from the light source | 100 mm from the light source |
|---|---|---|---|---|---|---|---|---|
| Example 17 | A | B | Passed | 1.24 | 8.5 | Passed | A | B |
| Comparative Example 13 | D | A | Passed | 1.24 | 8.7 | Rejected | A | C |
| Comparative Example 14 | A | E | Rejected | 1.24 | 8.2 | Passed | A | B |

TABLE 18-continued

| | Comparative Example 15 | — | — | — | — | — | — | — | — |

*Titanium oxide fine particles were used as light-diffusing fine particles.

In Table 18, for the interlayer film for a laminated glass of Example 17, the interlayer film for a laminated glass contains a small amount of foreign materials (undissolved materials) and exhibits excellent discoloration resistance. Furthermore, a laminated glass produced using the interlayer film for a laminated glass exhibits excellent penetration resistance, transparency and light-diffusing properties, and even when an interlayer film for a laminated glass made of a repetitively-heated kneaded matter is used, increase in a haze is inhibited. Meanwhile, the interlayer films for a laminated glass of Comparative Examples 13 and 14 is unsatisfactory for some performance. Comparative Example 15 was too viscous to form an interlayer film for a laminated glass.

Examples 18 to 22 and Comparative Examples 16 to 18

An interlayer film for a laminated glass was produced and evaluated as described for Example 1, substituting PVB shown in Table 19 for PVB-1. The results are shown in Table 19.

In Table 19, for the interlayer films for a laminated glass of Examples 18 to 22, the interlayer film for a laminated glass contains a small amount of foreign materials (undissolved materials) and exhibits excellent discoloration resistance. Furthermore, a laminated glass produced using the interlayer film for a laminated glass exhibits excellent penetration resistance, transparency and light-diffusing properties, and even when an interlayer film for a laminated glass made of a repetitively-heated kneaded matter is used, increase in a haze is inhibited. Meanwhile, the interlayer films for a laminated glass of Comparative Examples 16 to 18 which do not satisfy the conditions defined in the present invention is unsatisfactory for some performance.

Example 23 and Comparative Examples 19 to 20

An interlayer film for a laminated glass was produced and evaluated as described for Example 1, substituting PVB shown in Table 20 for PVB-1. The results are shown in Table 20.

TABLE 19

| | PVB | Polymerization degree | Acetalization degree (mol %) | % by mass | Light-diffusing fine particles Average particle size (μm) | $(A - B)/A$ | $(A - C)/A$ | $(b/y)/(a/x)$ | $(c/y)/(a/x)$ |
|---|---|---|---|---|---|---|---|---|---|
| Example 18 | PVB-8 | 1700 | 74.1 | 0.0101 | 1.18 | 0.48 | 0.66 | $4.70 * 10^{-2}$ | $2.04 * 10^{-2}$ |
| Example 19 | PVB-9 | 1700 | 74.2 | 0.0101 | 1.18 | 0.34 | 0.56 | $1.98 * 10^{-1}$ | $5.97 * 10^{-2}$ |
| Example 20 | PVB-10 | 1700 | 74.2 | 0.0101 | 1.18 | 0.24 | 0.47 | $1.53 * 10^{-2}$ | $6.86 * 10^{-3}$ |
| Example 21 | PVB-11 | 1700 | 63.2 | 0.0101 | 1.18 | 0.46 | 0.64 | $4.73 * 10^{-2}$ | $2.16 * 10^{-2}$ |
| Example 22 | PVB-12 | 1700 | 78.5 | 0.0101 | 1.18 | 0.50 | 0.65 | $4.59 * 10^{-2}$ | $1.99 * 10^{-2}$ |
| Comparative Example 16 | Comparative PVB-11 | 1700 | 74.1 | 0.0101 | 1.18 | 0.55 | 0.56 | $9.46 * 10^{-3}$ | $3.20 * 10^{-3}$ |
| Comparative Example 17 | Comparative PVB-12 | 1700 | 74.3 | 0.0101 | 1.18 | 0.17 | 0.26 | $4.59 * 10^{-1}$ | $1.58 * 10^{-1}$ |
| Comparative Example 18 | Comparative PVB-13 | 1200 | 74.3 | 0.0101 | 1.18 | 0.26 | 0.59 | $5.86 * 10^{-2}$ | $3.02 * 10^{-2}$ |

| | Evaluation of an interlayer film | | | | Evaluation of a laminated glass | | | |
| | | | | | | | Brightness | |
| | Undissolved materials | Discoloration resistance | Penetration resistance | Difference absolute value of refractive index | Haze (%) | Increase in a haze | 50 mm from the light source | 100 mm from the light source |
|---|---|---|---|---|---|---|---|---|
| Example 18 | A | A | Passed | 1.24 | 7.2 | Passed | A | B |
| Example 19 | A | B | Passed | 1.24 | 7.1 | Passed | A | B |
| Example 20 | C | A | Passed | 1.24 | 7.5 | Passed | A | B |
| Example 21 | B | A | Passed | 1.24 | 7.2 | Passed | A | B |
| Example 22 | A | B | Passed | 1.25 | 7.1 | Passed | A | B |
| Comparative Example 16 | D | A | Passed | 1.24 | 7.7 | Rejected | A | B |
| Comparative Example 17 | A | E | Rejected | 1.24 | 6.9 | Passed | A | B |
| Comparative Example 18 | A | A | Rejected | 1.24 | 6.8 | Passed | A | B |

*Titanium oxide fine particles were used as light-diffusing fine particles.

TABLE 20

| | PVB | Polymerization degree | Acetalization degree (mol %) | Light-diffusing fine particles | | | | | |
|---|---|---|---|---|---|---|---|---|---|
| | | | | % by mass | Average particle size (μm) | (A − B)/A | (A − C)/A | (b/y)/(a/x) | (c/y)/(a/x) |
| Example 23 | PVB-13 | 2400 | 74.6 | 0.0101 | 1.18 | 0.48 | 0.70 | $4.47 * 10^{-2}$ | $2.14 * 10^{-2}$ |
| Comparative Example 19 | Comparative PVB-14 | 2400 | 74.6 | 0.0101 | 1.18 | 0.85 | 0.90 | $8.65 * 10^{-3}$ | $3.38 * 10^{-3}$ |
| Comparative Example 20 | Comparative PVB-15 | 2400 | 74.5 | 0.0101 | 1.18 | 0.26 | 0.42 | $3.80 * 10^{-1}$ | $1.28 * 10^{-1}$ |

| | Evaluation of an interlayer film | | | Evaluation of a laminated glass | | | | |
|---|---|---|---|---|---|---|---|---|
| | | | | Difference | | | Brightness | |
| | Undissolved materials | Discoloration resistance | Penetration resistance | absolute value of refractive index | Haze (%) | Increase in a haze | 50 mm from the light source | 100 mm from the light source |
| Example 23 | A | B | Passed | 1.24 | 7.5 | Passed | A | B |
| Comparative Example 19 | D | A | Passed | 1.24 | 7.8 | Rejected | A | B |
| Comparative Example 20 | A | E | Rejected | 1.24 | 7.1 | Passed | A | B |

*Titanium oxide fine particles were used as light-diffusing fine particles.

In Table 20, for the interlayer film for a laminated glass of Example 23, the interlayer film for a laminated glass contains a small amount of foreign materials (undissolved materials) and exhibits excellent discoloration resistance. Furthermore, a laminated glass produced using the interlayer film for a laminated glass exhibits excellent penetration resistance, transparency and light-diffusing properties, and even when an interlayer film for a laminated glass made of a repetitively-heated kneaded matter is used, increase in a haze is inhibited. Meanwhile, the interlayer films for a laminated glass of Comparative Examples 19 to 20 which do not satisfy the conditions defined in the present invention is unsatisfactory for some performance.

Example 24 and Comparative Examples 21 to 22

An interlayer film for a laminated glass was produced and evaluated as described for Example 1, substituting PVB shown in Table 21 for PVB-1. The results are shown in Table 21.

TABLE 21

| | PVB | Polymerization degree | Acetalization degree (mol %) | Light-diffusing fine particles | | | | | |
|---|---|---|---|---|---|---|---|---|---|
| | | | | % by mass | Average particle size (μm) | (A − B)/A | (A − C)/A | (b/y)/(a/x) | (c/y)/(a/x) |
| Example 24 | PVB-14 | 3600 | 73.2 | 0.0101 | 1.18 | 0.78 | 0.78 | $3.73 * 10^{-2}$ | $1.85 * 10^{-2}$ |
| Comparative Example 21 | Comparative PVB-16 | 3600 | 73.8 | 0.0101 | 1.18 | 0.84 | 0.83 | $7.80 * 10^{-3}$ | $3.18 * 10^{-3}$ |
| Comparative Example 22 | Comparative PVB-17 | 3600 | 73.6 | 0.0101 | 1.18 | 0.49 | 0.66 | $3.70 * 10^{-1}$ | $9.81 * 10^{-2}$ |

| | Evaluation of an interlayer film | | | Evaluation of a laminated glass | | | | |
|---|---|---|---|---|---|---|---|---|
| | | | | Difference | | | Brightness | |
| | Undissolved materials | Discoloration resistance | Penetration resistance | absolute value of refractive index | Haze (%) | Increase in a haze | 50 mm from the light source | 100 mm from the light source |
| Example 24 | A | B | Passed | 1.24 | 8.0 | Passed | A | B |
| Comparative Example 21 | D | A | Passed | 1.24 | 8.4 | Rejected | A | B |
| Comparative Example 22 | A | E | Rejected | 1.24 | 7.7 | Passed | A | B |

In Table 21, for the interlayer film for a laminated glass of Example 24, the interlayer film for a laminated glass contains a small amount of foreign materials (undissolved materials) and exhibits excellent discoloration resistance. Furthermore, a laminated glass produced using the interlayer film for a laminated glass exhibits excellent penetration resistance, transparency and light-diffusing properties, and even when an interlayer film for a laminated glass made of a repetitively-heated kneaded matter is used, increase in a haze is inhibited. Meanwhile, the interlayer films for a laminated glass of Comparative Examples 21 to 22 which do not satisfy the conditions defined in the present invention is unsatisfactory for some performance.

The invention claimed is:

1. An interlayer film, comprising a composition comprising:
    a polyvinyl acetal with an acetalization degree of from 60 to 80 mol %, a content of a vinyl ester monomer unit of from 0.1 to 20 mol % and a viscosity-average degree of polymerization of from 1400 to 4000, and
    light-diffusing fine particles having an average particle size of from 0.20 to 10 μm,
    wherein an absolute value difference between a refractive index of the light-diffusing fine particles and a refractive index of the composition excluding the light-diffusing fine particles is 0.20 or more;
    a haze as measured in accordance with JIS K 7105 for a laminated glass prepared by sandwiching the interlayer film between two glass sheets with a thickness of 3 mm is 20% or less, and
    the interlayer film satisfies formulas (1) and (2):

$$(A-B)/A < 0.80 \quad (1); \text{ and}$$

$$1.00 \times 10^{-2} < (b/y)/(a/x) < 2.00 \times 10^{-1} \quad (2),$$

wherein A is a peak-top molecular weight of the polyvinyl acetal as measured by a differential refractive index detector in gel-permeation chromatographic measurement of said interlayer film heated at 230° C. for 3 hours;
    a is a signal strength at the peak-top molecular weight A;
    B is a peak-top molecular weight of the polyvinyl acetal as measured by an absorptiometer, measured at 280 nm wavelength, in gel-permeation chromatographic measurement of said interlayer film heated at 230° C. for 3 hours;
    b is a signal strength at the peak-top molecular weight B;
    x is a signal strength at a peak-top molecular weight as measured by a differential refractive index detector in gel-permeation chromatographic measurement of a monodisperse polymethyl methacrylate with a weight-average molecular weight of about 85,000; and
    y is a signal strength at a peak-top molecular weight as measured by an absorptiometer, measured at 220 nm wavelength, in gel-permeation chromatographic measurement of said monodisperse polymethyl methacrylate.

2. The interlayer film of claim 1, which further satisfies formulas (3) and (4):

$$(A-C)/A < 0.80 \quad (3); \text{ and}$$

$$5.00 \times 10^{-} < (c/y)/(a/x) < 7.00 \times 10^{-2} \quad (4),$$

wherein A is a peak-top molecular weight of the polyvinyl acetal as measured by a differential refractive index detector in gel-permeation chromatographic measurement of said interlayer film heated at 230° C. for 3 hours;
    C is a peak-top molecular weight of the polyvinyl acetal as measured by an absorptiometer, measured at 320 nm wavelength, in gel-permeation chromatographic measurement of said interlayer film for a laminated glass heated at 230° C. for 3 hours;
    c is a signal strength at the peak-top molecular weight C
    a is a signal strength at the peak-top molecular weight A;
    x is a signal strength at a peak-top molecular weight as measured by a differential refractive index detector in gel-permeation chromatographic measurement of a monodisperse polymethyl methacrylate with a weight-average molecular weight of about 85,000; and
    y is a signal strength at a peak-top molecular weight as measured by an absorptiometer, measured at 220 nm wavelength, in gel-permeation chromatographic measurement of said monodisperse polymethyl methacrylate.

3. The interlayer film of claim 1,
    wherein said polyvinyl acetal is a polyvinyl butyral.

4. The interlayer film of claim 1, further comprising a plasticizer.

5. The interlayer film of claim 4, wherein the plasticizer is triethylene glycol di(2-ethylhexanoate).

6. The interlayer film of claim 1,
    wherein said light-diffusing fine particles comprise an inorganic compound.

7. The interlayer film of claim 6,
    wherein said inorganic compound is a metal oxide.

8. The interlayer film of claim 7, wherein said metal oxide is titanium oxide.

9. The interlayer film of claim 7, wherein said metal oxide is zinc oxide.

10. The interlayer film of claim 6,
    wherein the composition comprises said light-diffusing fine particles in an amount from 0.001 to 0.040% by mass of the composition.

11. A laminated glass consisting of:
    the interlayer film of claim 1 and
    a plurality of glass sheets bonded via the interlayer film.

12. A light diffusion plate, comprising:
    the laminated glass of claim 11, as a structural component.

* * * * *

UNITED STATES PATENT AND TRADEMARK OFFICE
CERTIFICATE OF CORRECTION

PATENT NO. : 10,259,198 B2
APPLICATION NO. : 15/118937
DATED : April 16, 2019
INVENTOR(S) : Takuya Kobayashi et al.

Page 1 of 1

It is certified that error appears in the above-identified patent and that said Letters Patent is hereby corrected as shown below:

In the Specification

Column 10, Line 25 (formula (4")), delete "(c/y)/(a/x) < 5.00 × $10^{2}$" and insert -- "(c/y)/(a/x) < 5.00 × $10^{-2}$" --.

In the Claims

Column 54, Line 7 (formula (4)), delete "5.00 × $10^{-}$ < (c/y)/(a/x)" and insert -- "5.00 × $10^{-3}$ < (c/y)/(a/x)" --.

Signed and Sealed this
Fourteenth Day of April, 2020

Andrei Iancu
*Director of the United States Patent and Trademark Office*